(12) United States Patent
Hirade

(10) Patent No.: US 7,260,140 B2  
(45) Date of Patent: Aug. 21, 2007

(54) CORRELATOR ALLOCATION CONTROL PROCESS FOR ALLOCATING CORRELATOR GROUP AS DIVIDED INTO SHARED CORRELATORS AND DEDICATED CORRELATORS

(75) Inventor: Sei Hirade, Tokyo (JP)

(73) Assignee: NEC Corporation (JP)

( * ) Notice: Subject to any disclaimer, the term of this patent is extended or adjusted under 35 U.S.C. 154(b) by 743 days.

(21) Appl. No.: 10/773,670

(22) Filed: Feb. 6, 2004

(65) Prior Publication Data

US 2004/0161021 A1 Aug. 19, 2004

(30) Foreign Application Priority Data

Feb. 7, 2003 (JP) .............................. 2003-030361

(51) Int. Cl.
*H04B 1/00* (2006.01)

(52) U.S. Cl. ..................................... 375/150

(58) Field of Classification Search ................ 375/142, 375/147, 148, 150, 130, 136; 370/335, 441, 370/442
See application file for complete search history.

(56) References Cited

U.S. PATENT DOCUMENTS 6,704,552 B1* 3/2004 Matsumoto .............. 455/164.1
6,768,729 B1* 7/2004 Ohsuge ...................... 370/342
2002/0140603 A1 10/2002 Jeschke

FOREIGN PATENT DOCUMENTS

| JP | 11-191896 | 7/1999 |
| JP | 2000-068981 | 3/2000 |
| JP | 2001-094473 | 4/2001 |
| JP | 2001-189680 | 7/2001 |
| JP | 2002-009663 | 1/2002 |

OTHER PUBLICATIONS

Search Report from European Patent Office issued Sep. 20, 2004 in connection with corresponding application No. EP 04 25 0648.

* cited by examiner

*Primary Examiner*—Emmanuel Bayard
(74) *Attorney, Agent, or Firm*—Ostrolenk, Faber, Gerb & Soffen, LLP

(57) ABSTRACT

A delay profile calculator comprises dedicated correlators and shared correlators, and calculates the numbers of shared correlators allocated to respective users from the number of subscribing users and the total number of shared correlators. If the number of subscribing users is small, i.e., if there are excessive correlators, then it is possible to increase the number of correlators allocated to one user.

12 Claims, 21 Drawing Sheets

CORRELATOR ALLOCATION CONTROL PROCESS FOR ALLOCATING CORRELATOR GROUP AS DIVIDED INTO SHARED CORRELATORS AND DEDICATED CORRELATORS

BACKGROUND OF THE INVENTION

1. Field of the Invention

The present invention relates to a CDMA receiver in a CDMA mobile communication system and a correlator allocation control method, and more particularly to a CDMA receiver and a correlator allocation control method which are capable of increasing the accuracy with which to track a path.

2. Description of the Related Art

There have heretofore been known CDMA receivers comprising a finger assembly and a searcher which has a correlator group, an adder group, and a path controller for searching for high-level reception timings from added corrected values and determining a reception timing at which to receive a signal with the finger assembly.

FIG. 1 of the accompanying drawings illustrates an instance of correlator allocation in a conventional delay profile calculator. In FIG. 1, the number of correlators 71 allocated to one user is 4, and the maximum number M of subscribing users is 4. As shown in FIG. 1, the number of correlators allocated to one user is fixed according to the conventional correlator allocation process.

The term "user" refers to a communication circuit or a mobile terminal to be connected for wireless communications, and the term "number of users" refers to the number of communication circuits or mobile terminals.

Japanese laid-open patent publication No. 2001-94473 discloses a conventional synchronous supplementary search process wherein correlators are selected from a plurality of searcher groups and allocated to users. Japanese laid-open patent publication No. 2001-189680 reveals a despreading apparatus which allocates a number of fingers depending on a path to users.

However, the conventional correlator allocation process has suffered the following problems:

According to the conventional correlator allocation process, the number of correlators allocated to one user is fixed regardless of the number of subscribing users. The time for calculating a delay profile is proportional to the size of a cell radius. Therefore, the conventional correlator allocation process has a first problem in that if the number of subscribing users is small, i.e., even if there are excessive correlators, the accuracy with which to track a path is lowered as the cell radius increases.

The conventional correlator allocation process also has a second problem in that if the number of subscribing users is small and the correlator allocation process is modified to allocate all the remaining excessive correlators, then when many new users are activated at once, the synchronism among the new users is deteriorated.

SUMMARY OF THE INVENTION

It is therefore an object of the present invention to provide a CDMA receiver and a correlator allocation control method which will solve the above problems.

To achieve the above object, a CDMA receiver according to the present invention has a searcher comprising a delay profile calculator and a correlator allocation controller. The delay profile calculator has A dedicated correlators (A is an integer of 2 or greater) allocated to each user and C shared correlators (C is an integer of 2 or greater) allocated to each user. The correlator allocation controller calculates the numbers (f1 through fM) of shared correlators allocated to respective subscribing users (Y1 through YM (M: the maximum number of subscribing users) based on the number of subscribing users and the total number (C) of shared correlators allocated to the subscribing users, and outputs data indicative of the numbers of shared correlators allocated to the respective subscribing users to the delay profile calculator.

According to the present invention, a subscribing user number measuring unit counts the number of subscribing users, and a shared correlator number calculator calculates the numbers of shared correlators allocated to the subscribing users from the measured number of subscribing users and the total number of shared correlators. Therefore, if the number of subscribing users is small, i.e., if there are excessive correlators, the number of correlators that can be allocated to one user can be increased. Consequently, the period of time required to calculate a delay profile can be shortened, and it is possible to solve the problem of the conventional process of allocating correlators, i.e., the accuracy with which to track a path is lowered as the cell radius increases.

Furthermore, inasmuch as the delay profile calculator comprises dedicated correlators and shared correlators, rather than shared correlators only, it is possible to immediately assign dedicated correlators to new users. Consequently, the conventional problem that when many new users are activated at once, the synchronism among the new users is deteriorated can be solved.

The above and other objects, features, and advantages of the present invention will bercome apparent from the following description with reference to the accompanying drawings which illustrate examples of the present invention.

DETAILED DESCRIPTION OF THE PREFERRED EMBODIMENTS

1st Embodiment

Figure 1:
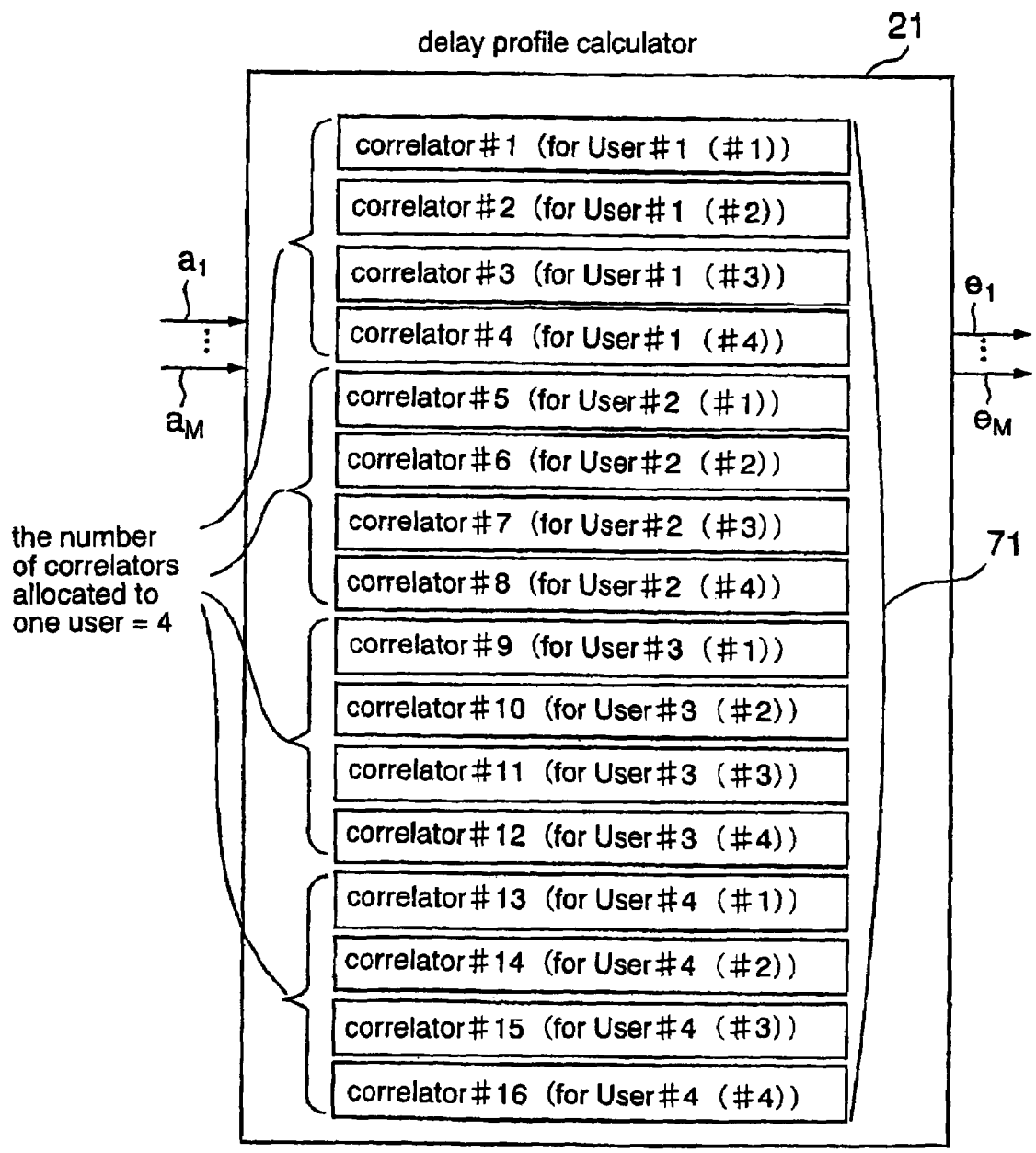
FIG. 1 is a block diagram showing an arrangement of a conventional delay profile calculator.
Figure 2:
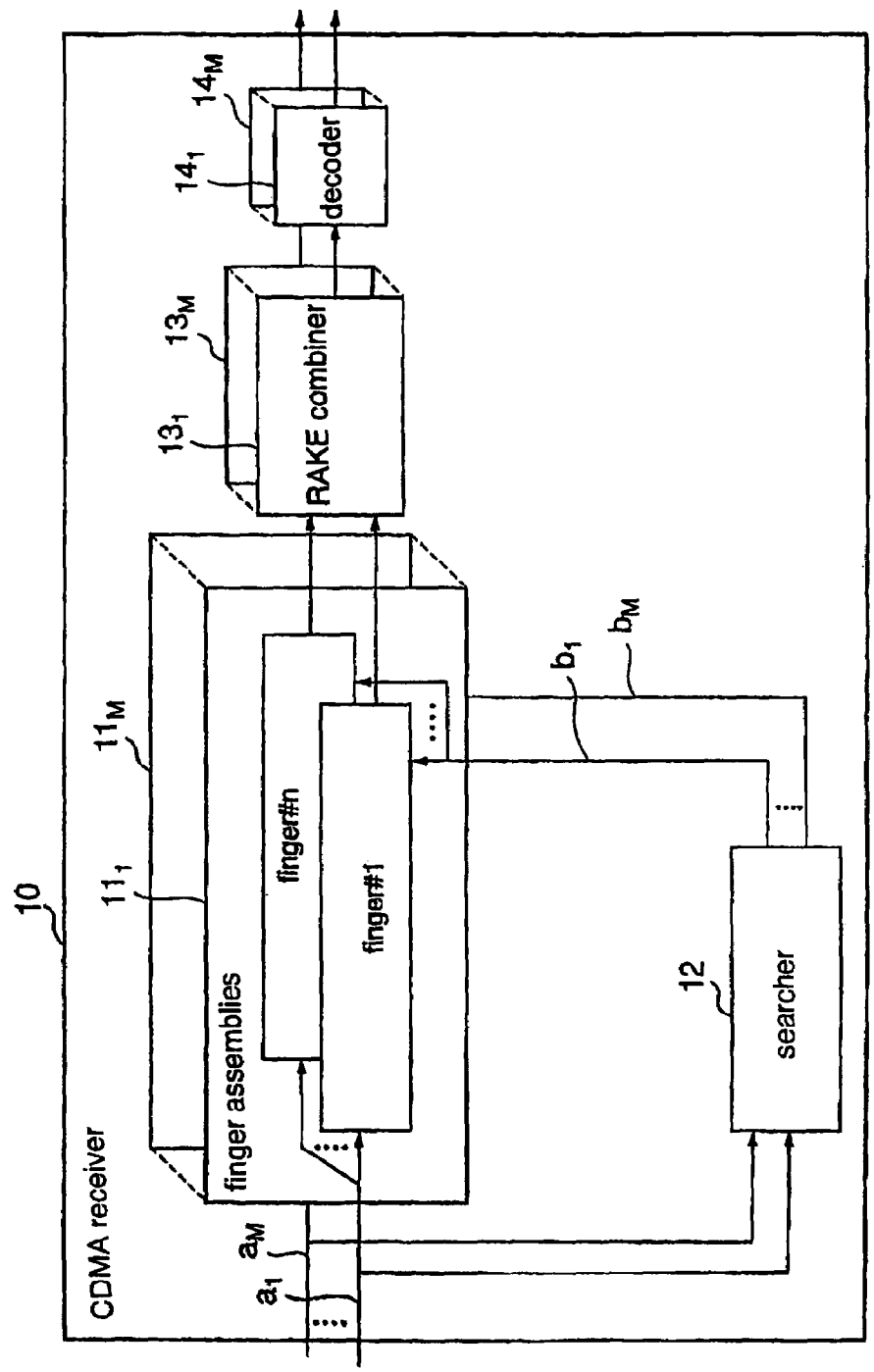
FIG. 2 is a block diagram of an arrangement of a CDMA receiver according to a first embodiment of the present invention.

FIG. 2 shows in block form an arrangement of a CDMA receiver according to a first embodiment of the present invention. As shown in FIG. 2, CDMA receiver 10 comprises a plurality of finger assemblies 111 through 11M provided for respective users, searcher 12, a plurality of RAKE combiners 131 through 13M provided for the respective users, and a plurality of decoders 141 through 14M provided for the respective users.

Reception data a1 through aM for the respective users that have been input to CDMA receiver 10 are supplied to finger assemblies 111 through 11M and searcher 12. Searcher 12 determines correlated value levels while slightly shifting despreading times for reception data a1 through aM for the respective users, searches for optimum reception timings, and indicates reception timings at which to receive data with finger assemblies 111 through 11M to fingers #1 through #n in each of finger assemblies 111 through 11M at peak timings b1 through bM for the respective users.

Finger assemblies 111 through 11M are provided for the respective users. Finger assembly 111, for example, will be described below. Finger assembly 111 despreads reception data a1 at the reception timing indicated at peak timing b1, and detects the reception data. Output data from finger assembly 111 are supplied to RAKE combiner 131, which adds the data. The added data is then decoded by decoder 141. Fingers #1 through #n in each of finger assemblies 111 are provided depending on the number of paths processed by CDMA receiver 10. If n=10 in finger assembly 111, then it is possible to make a RAKE combination of up to 10 paths.

Figure 3:
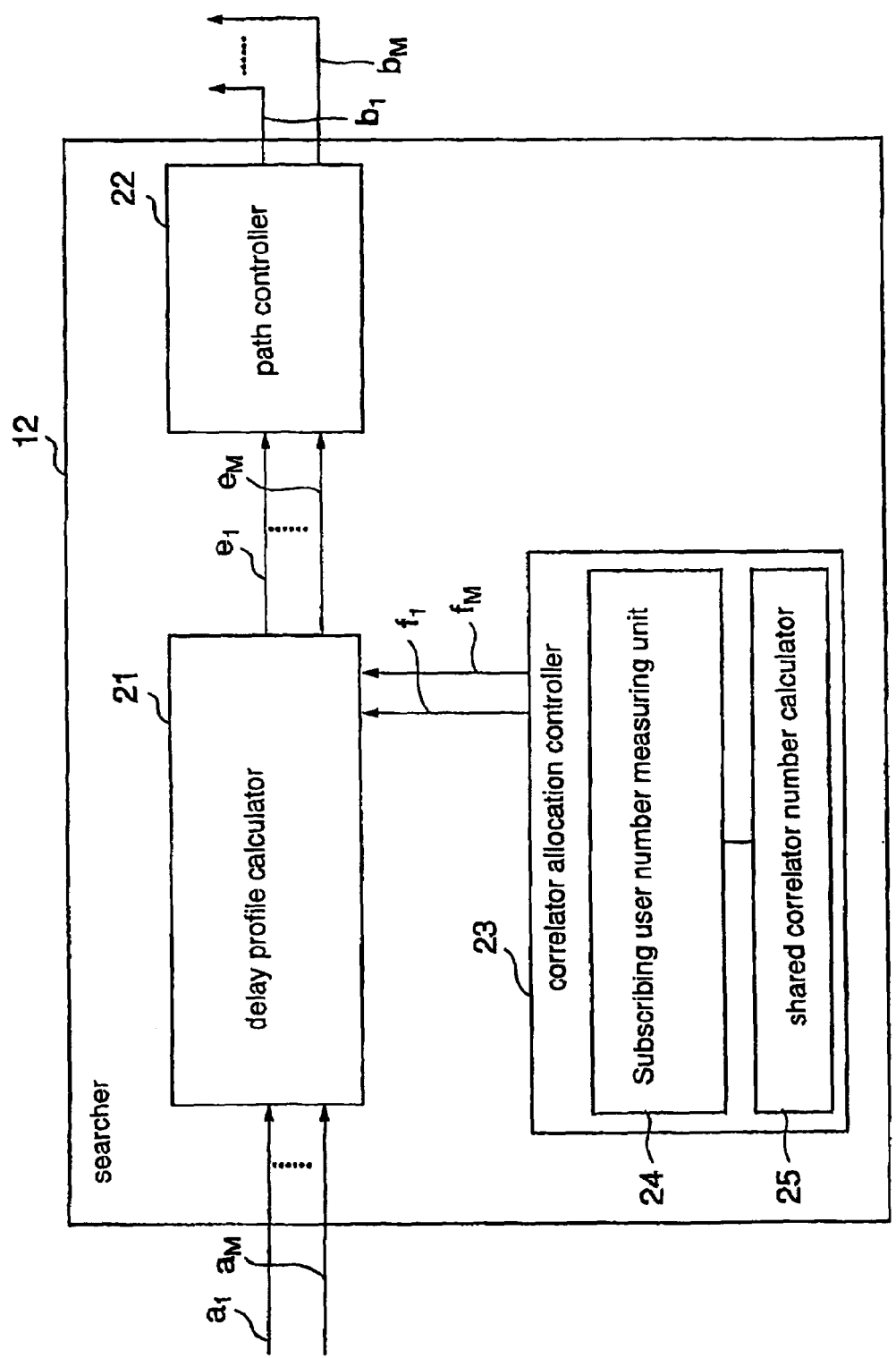
FIG. 3 is a block diagram showing details of a searcher of the CDMA receiver.

FIG. 3 is a block diagram showing details of the searcher shown in FIG. 2. As shown in FIG. 3, the searcher comprises delay profile calculator 21, path controller 22, and correlator allocation controller 23.

Delay profile calculator 21 determines correlated value levels while slightly shifting despreading times for reception data a1 through aM for the respective users, and outputs added correlated values (delay profiles) e1 through eM for the respective users to path controller 22. Path controller 22 searches for high-level reception timings, i.e., peaks, for the respective users from added correlated values e1 through eM, and indicates reception timings at which to receive data with finger assemblies 111 through 11M to fingers #1 through #n in each of finger assemblies 111 through 11M at peak timings b1 through bM for the respective users.

Correlator allocation controller 23 comprises subscribing user number measuring unit 24 and shared correlator number calculator 25. Subscribing user number measuring unit 24 counts the number of subscribing users, and outputs the counted number of subscribing users to shared correlator number calculator 25. Shared correlator number calculator 25 calculates the numbers of shared correlators allocated to the respective users from the number of subscribing users and the total number C of shared correlators 42, and outputs the numbers of shared correlator numbers f1 through fM for the respective users to delay profile calculator 21.

Figure 5:
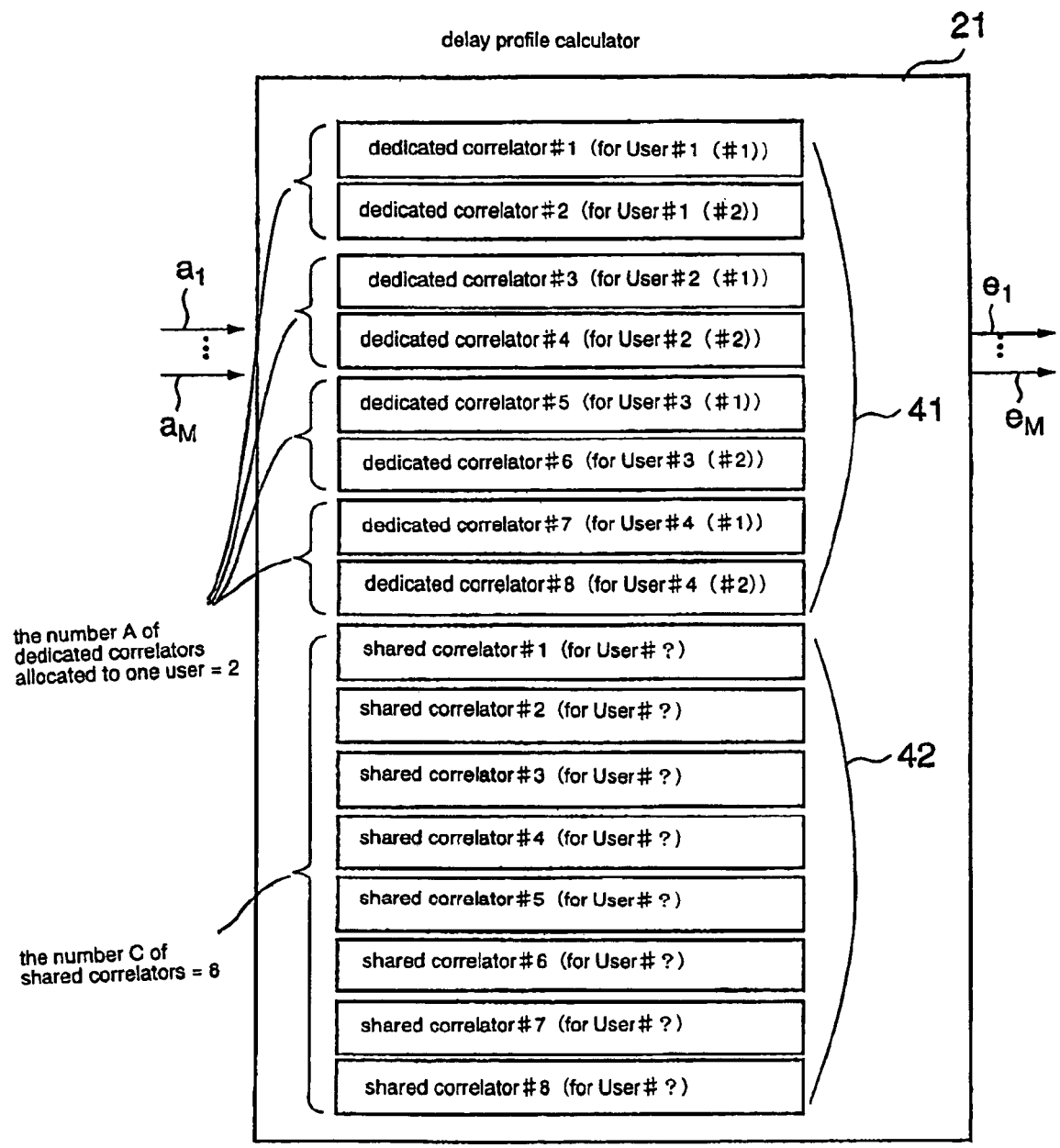
FIG. 5 is a block diagram showing details of a delay profile calculator in the searcher.

FIG. 5 is a block diagram showing details of delay profile calculator 21 shown in FIG. 3. As shown in FIG. 5, delay profile calculator 21 comprises dedicated correlators 41 and shared correlators 42. The number of correlators allocated to one user is the sum of the number A of dedicated correlators 41 allocated to one user and the numbers f1 through fM of shared correlators 42 for the respective users. The numbers f1 through fM of shared correlators 42 for the respective users are calculated by correlator allocation controller 23. In FIG. 5, it is assumed that the number A of dedicated correlators 41 allocated to one user is A=2, the total number C of shared correlators 42 is C=8, and the maximum number M of subscribing users is M=4.

Figure 6:
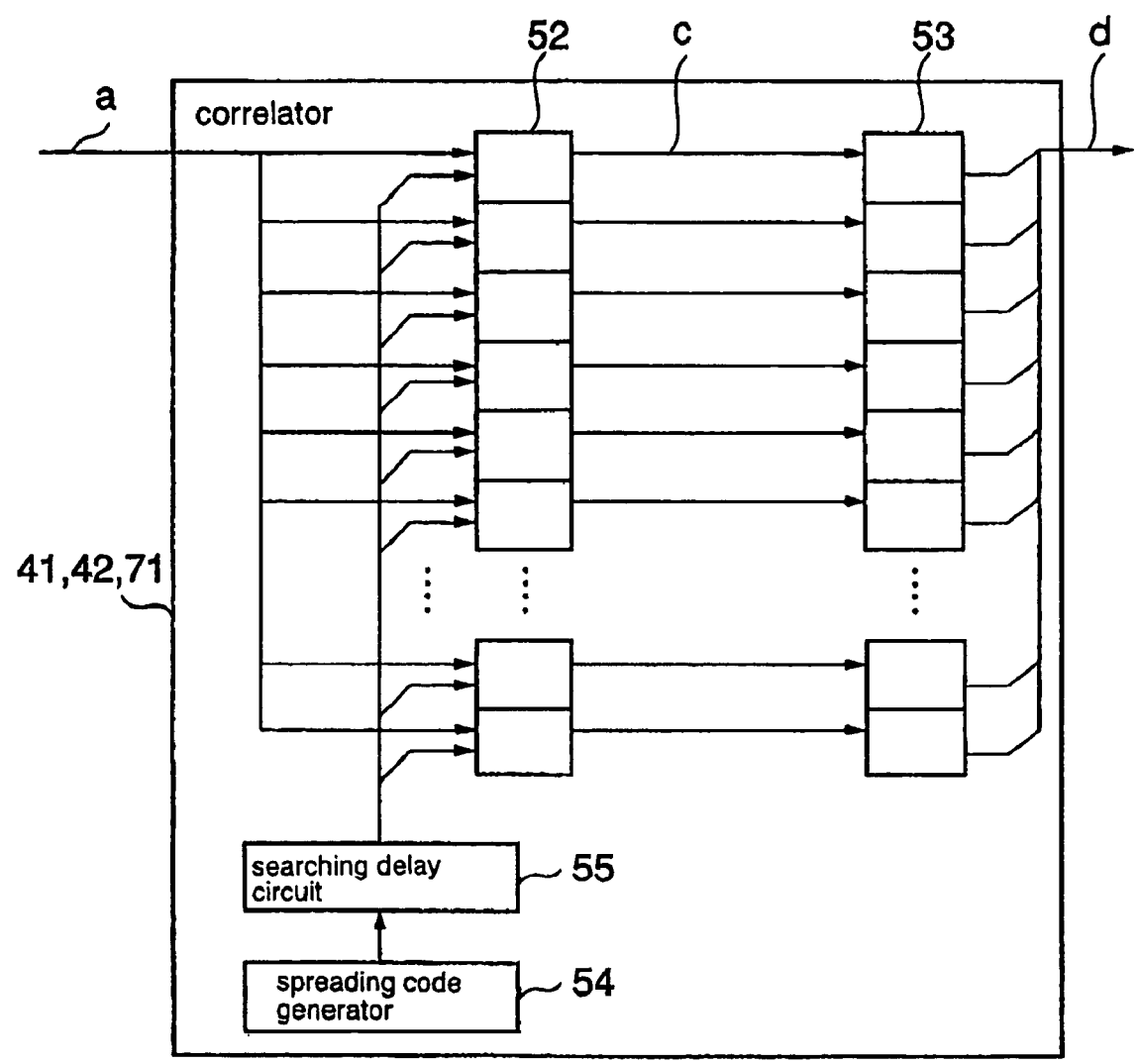
FIG. 6 is a block diagram showing details of each of correlators in the delay profile calculator.

FIG. 6 is a block diagram showing details of each of correlators 41, 42, 71 in delay profile calculator 21 shown in FIG. 5. As shown in FIG. 6, reception data a is input to each of correlators of correlator group 52. The correlators despread the reception data at slightly different reception timings. Correlated values c output from the correlators are input to respective adders of adder group 53.

Each of the adders adds (integrates) the corrected value by an indicated number of times (which comprises a variable parameter), and outputs the added corrected value (delay profile) d. Spreading code generator 54 generates a spreading code for despreading the data with correlators 52, and outputs the generated spreading code to searching delay circuit 55.

Operation of the CDMA receiver according to the present embodiment will be described in detail below with reference to FIGS. 3, 4, 5, and 7 through 9.

Figure 4:
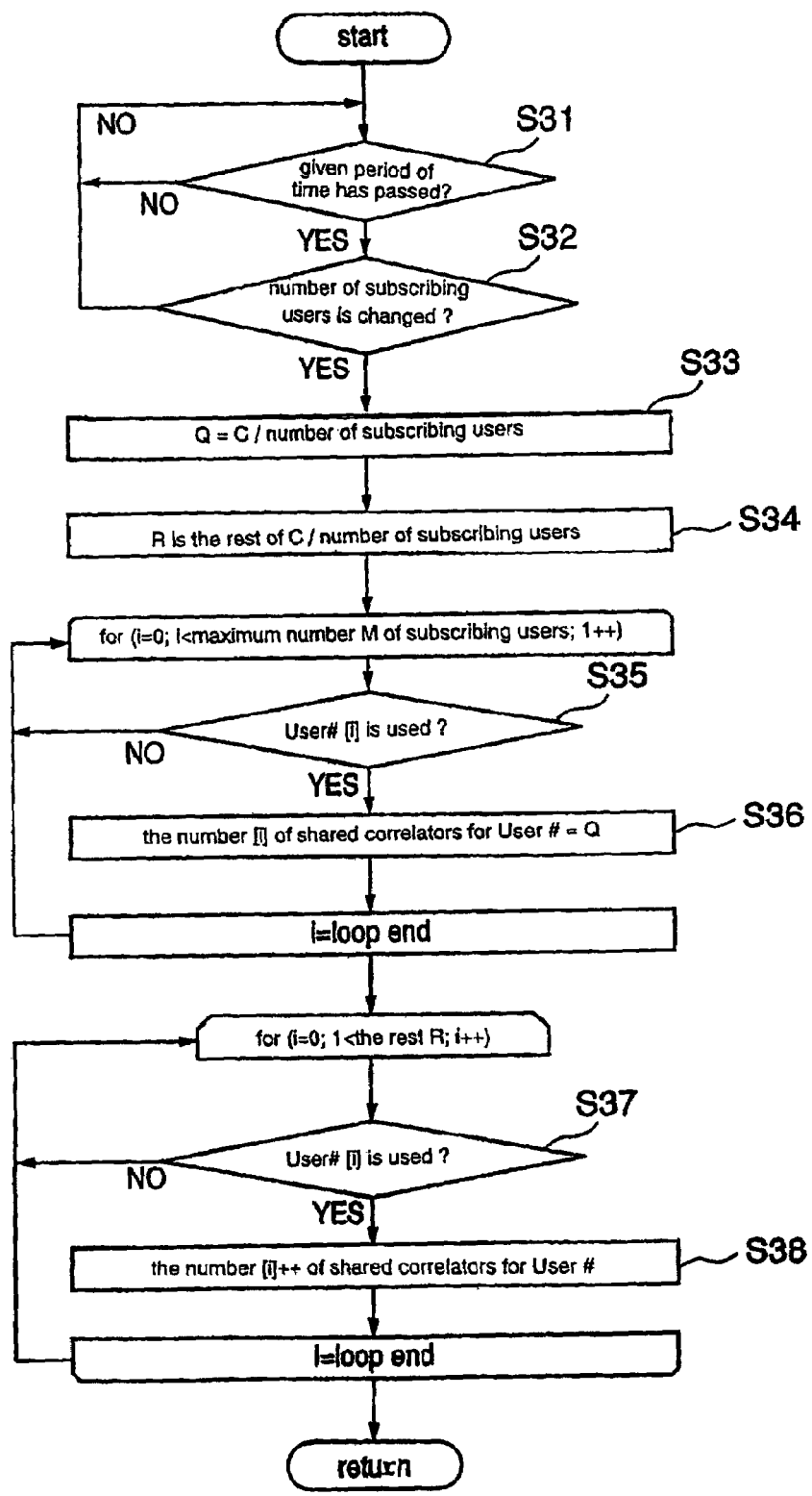
FIG. 4 is a flowchart of an operation sequence of a shared correlator number calculator in the searcher.

As shown in FIG. 3, correlator allocation controller 23 comprises subscribing user number measuring unit 24 and shared correlator number calculator 25. Subscribing user number measuring unit 24 counts the number of subscribing users, and outputs the counted number of subscribing users to shared correlator number calculator 25. As shown in FIG. 4, shared correlator number calculator 25 makes a comparison in each given period of time to determine whether the number of subscribing users has been changed or not (S31, S32). If the number of subscribing users has been changed, then shared correlator number calculator 25 calculates the numbers of shared correlators allocated to the respective users from the number of subscribing users and the total number C of shared correlators 42 (S33 through S38), and outputs the numbers of shared correlator numbers f1 through fM for the respective users to delay profile calculator 21.

As shown in FIG. 5, delay profile calculator 21 comprises dedicated correlators 41 and shared correlators 42. As described above, it is assumed that the number A of dedicated correlators 41 allocated to one user is A=2, the total number C of shared correlators 42 is C=8, and the maximum number M of subscribing users is M=4. The number of correlators allocated to one user is the sum of the number A of dedicated correlators 41 allocated to one user and the numbers f1 through fM of shared correlators 42 for the respective users.

Figure 7:
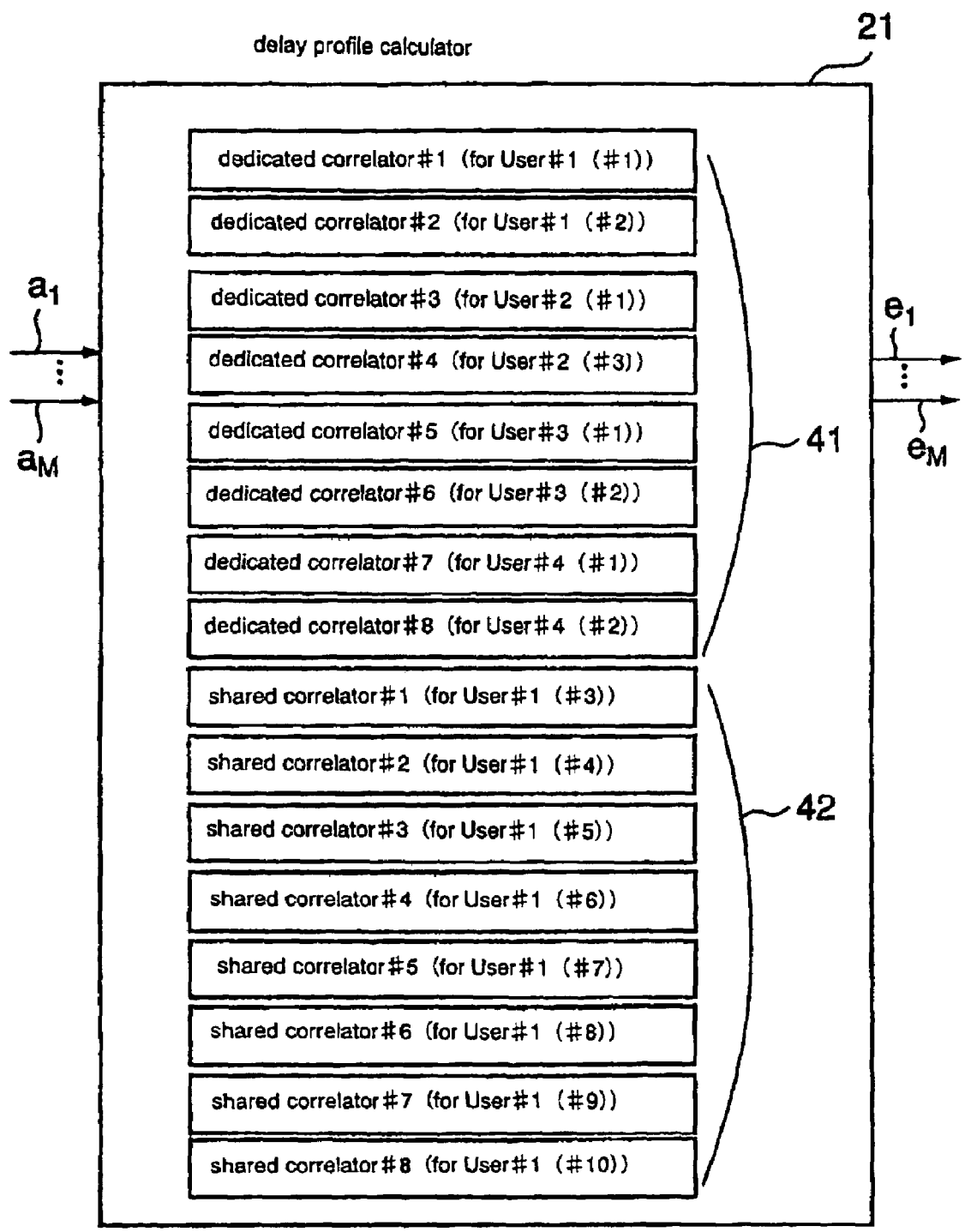
FIG. 7 is a block diagram illustrative of an instance of correlator allocation in the delay profile calculator.
Figure 8:
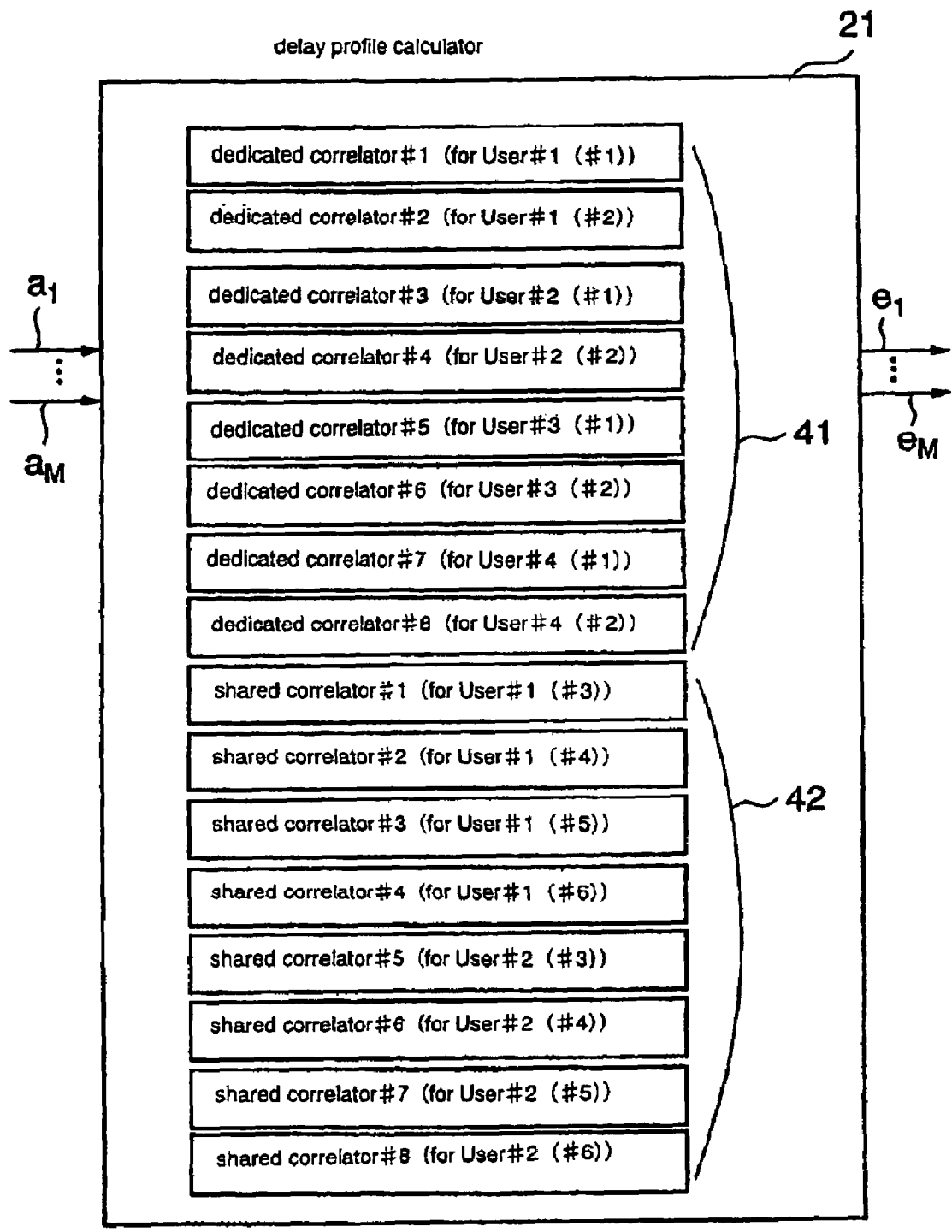
FIG. 8 is a block diagram illustrative of another instance of correlator allocation in the delay profile calculator.
Figure 9:
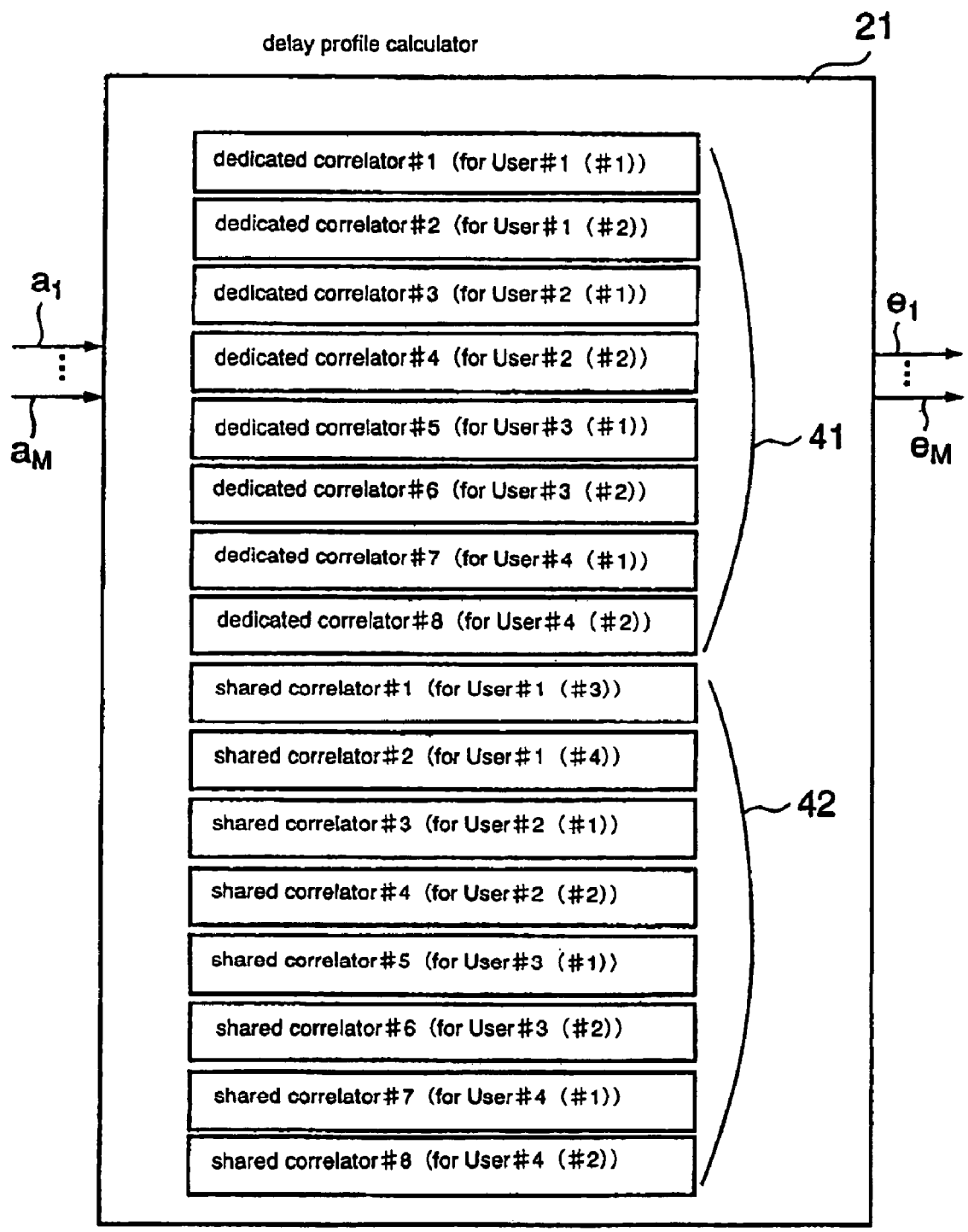
FIG. 9 is a block diagram illustrative of still another instance of correlator allocation in the delay profile calculator.

FIGS. 7 through 9 show instances of correlator allocation in delay profile calculator 21. FIG. 7 shows the instance wherein the number of subscribing users is 1, FIG. 8 the instance wherein the number of subscribing users is 2, and FIG. 9 the instance wherein the number of subscribing users is 4 (=the maximum number M of subscribing users). In each of FIGS. 7 through 9, it is assumed that the number A of dedicated correlators 41 allocated to one user is A=2, the total number C of shared correlators 42 is C=8, and the maximum number M of subscribing users is M=4.

In FIG. 7, since the number of subscribing users is 1, the number f1 of shared correlators 42 for User #1 is f1=8, and the number of correlators allocated to User #1 is the sum of the number A of dedicated correlators 41 allocated to one user and the number f1 of shared correlators 42 for User #1, i.e., 2+8=10.

In FIG. 8, since the number of subscribing users is 2, the numbers f1, f2 of shared correlators 42 for User #1, User #2 are 4, and the number of correlators allocated to User #1, User #2 is the sum of the number A of dedicated correlators 41 allocated to one user and the numbers f1, f2 of shared correlators 42 for User #1, User #2, i.e., 2+4=6.

In FIG. 9, since the number of subscribing users is 4 (=the maximum number M of subscribing users), the numbers f1, f2, f3, f4 of shared correlators 42 for User #1, User #2, User #3, and User #4 are 2, and the number of correlators allocated to User #1, User #2, User #3, and User #4 is the sum of the number A of dedicated correlators 41 allocated to one user and the numbers f1, f2, f3, f4 of shared correlators 42 for User #1, User #2, User #3, and User #4, i.e., 2+2=4.

As described above, subscribing user number measuring unit 24 counts the number of subscribing users, and shared correlator number calculator 25 calculates the numbers of shared correlators allocated to the respective users from the number of subscribing users and the total number C of shared correlators 42. Therefore, if the number of subscribing users is small, i.e., if there are excessive correlators, the number of correlators that can be allocated to one user can be increased, and the period of time required to calculate a delay profile can be shortened.

Accordingly, it is possible to solve the problem of the conventional process of allocating correlators, i.e., if the number of subscribing users is small, i.e., even if there are excessive correlators, the accuracy with which to track a path is lowered as the cell radius increases.

Furthermore, inasmuch as delay profile calculator 21 comprises dedicated correlators 41 and shared correlators 42, rather than shared correlators 42 only, it is possible to immediately assign dedicated correlators 41 to new users. Consequently, the conventional problem that when many new users are activated at once, the synchronism among the new users is deteriorated can be solved.

2nd Embodiment

A second embodiment of the present invention will be described in detail below with reference to FIGS. 10 and 11.

Figure 10:
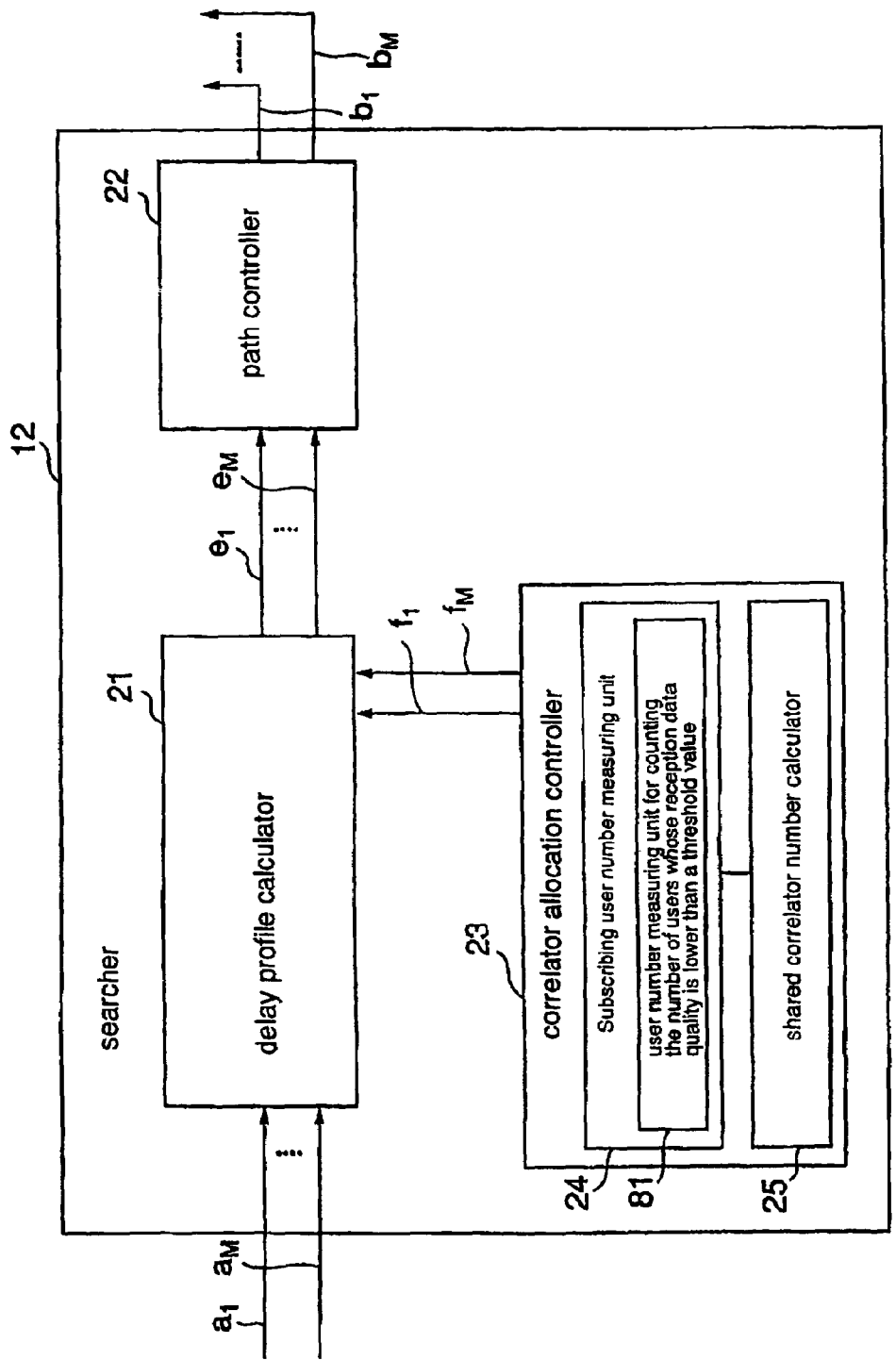
FIG. 10 is a block diagram showing details of a searcher according to a second embodiment of the present invention.

FIG. 10 is a block diagram showing details of a searcher according to a second embodiment of the present invention. The second embodiment differs from the first embodiment in that the quality of reception data is taken into account when the number of shared correlators allocated to users is calculated from the number of subscribing users and the total number C of shared correlators 42 by shared correlator number calculator 25.

Subscribing user number measuring unit 24 counts the number of subscribing users, and also has user number measuring unit 81 for counting the number of users whose reception data quality is lower than a threshold value. User number measuring unit 81 counts the number of users whose reception data quality is lower than the threshold value based on the quantity of reception data received by the users. If the number of users whose reception data quality is lower than the threshold value is greater than 0, then user number measuring unit 81 outputs the number of users whose reception data quality is lower than the threshold value to shared correlator number calculator 25. If the number of users whose reception data quality is lower than the threshold value is 0, then user number measuring unit 81 outputs the number of subscribing users to shared correlator number calculator 25.

Shared correlator number calculator 25 calculates the numbers of shared correlators allocated to the respective users from the number of subscribing users and the total number C of shared correlators 42, and outputs the numbers f1 through fM of shared correlators to delay profile calculator 21.

Figure 11:
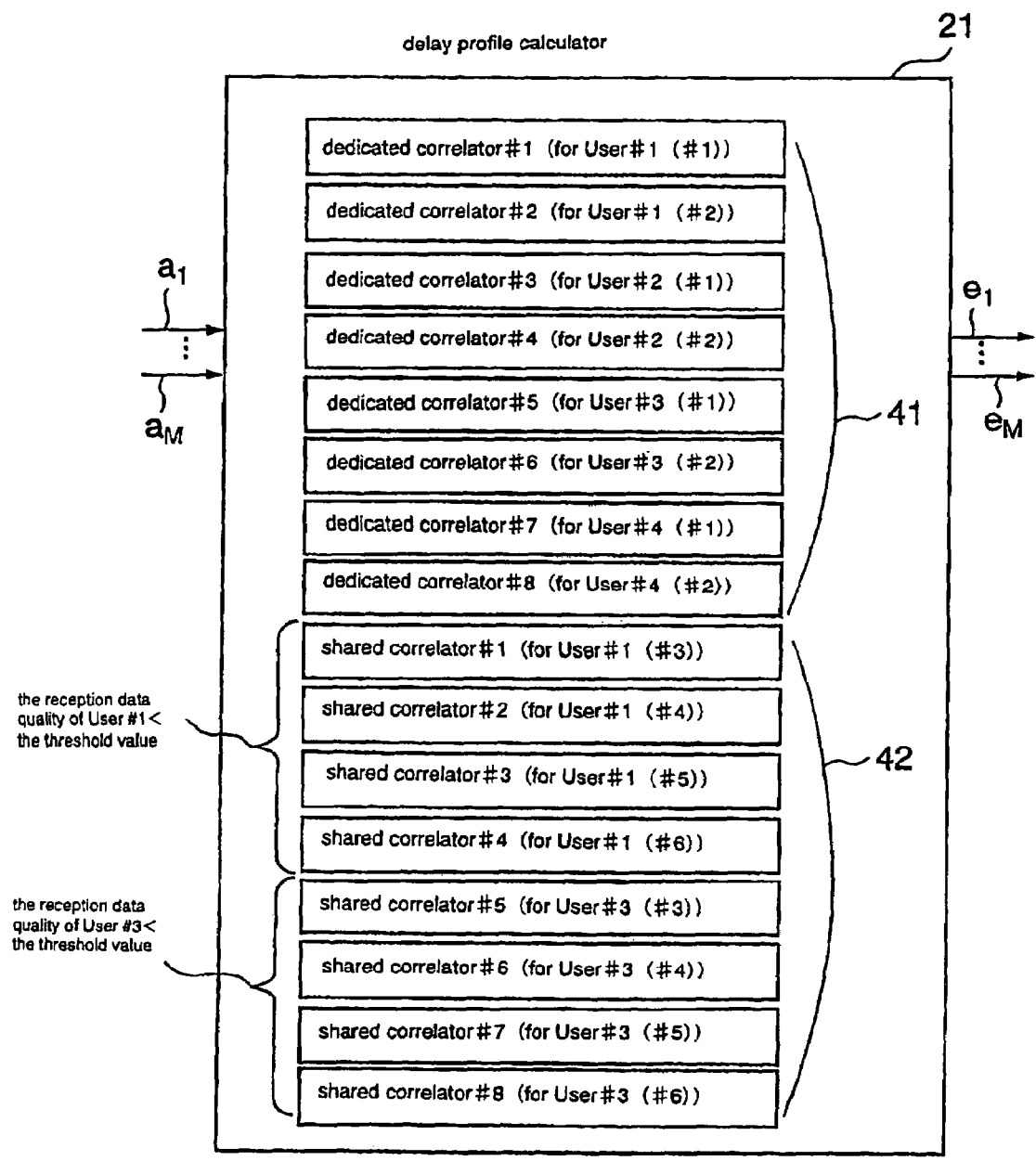
FIG. 11 is a block diagram illustrative of an instance of correlator allocation in a delay profile calculator according to the second embodiment of the present invention.

FIG. 11 is illustrative of an instance of correlator allocation in delay profile calculator 21. In FIG. 11, the number of subscribing users is 3, and the number of users whose reception data quality is lower than the threshold value is 2>0 (the reception data quality of User #1, User #2 is lower than the threshold value).

It is assumed that the number A of dedicated correlators 41 allocated to one user is A=2, the total number C of shared correlators 42 is C=8, and the maximum number M of subscribing users is M=4.

In FIG. 11, since the number of subscribing users is 3, and the number of users whose reception data quality is lower than the threshold value is 2>0 (the reception data quality of User #1, User #2 is lower than the threshold value), the number of shared correlators 42 for User #1, User #2 is 4, and the number of shared correlators 42 for User #3 is 0. The number of correlators allocated to User #1, User #2 is the sum of the number A of dedicated correlators 41 allocated to one user and the numbers f1, f2 of shared correlators 42 for User #1, User #2, i.e., 2+4=6. The number of correlators allocated to User #3 is the sum of the number A of dedicated correlators 41 allocated to one user and the number f3 of shared correlators 42 for User #3, i.e., 2+0=2.

According to the above processing sequence, it is possible to allocate more correlators to users whose reception data quality is lower.

3rd Embodiment

A third embodiment of the present invention will be described in detail below with reference to FIGS. 12 and 13.

Figure 12:
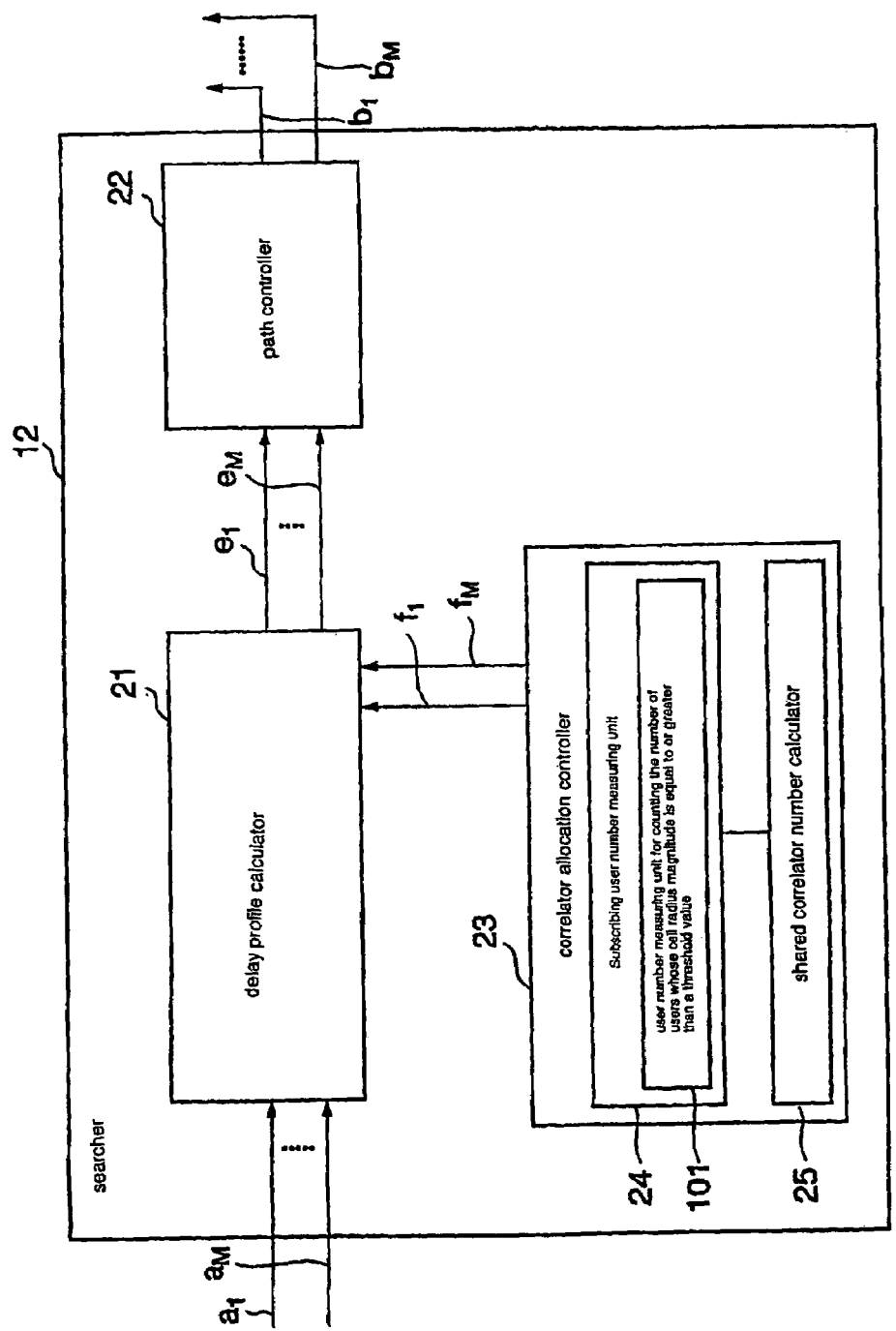
FIG. 12 is a block diagram showing details of a searcher according to a third embodiment of the present invention.

FIG. 12 is a block diagram showing details of a searcher according to a third embodiment of the present invention. The third embodiment differs from the first embodiment in that the magnitude of a cell radius is taken into account when the number of shared correlators allocated to users is calculated from the number of subscribing users and the total number C of shared correlators 42 by shared correlator number calculator 25.

Subscribing user number measuring unit 24 counts the number of subscribing users, and also has user number measuring unit 101 for counting the number of users whose cell radius magnitude is equal to or greater than a threshold value. User number measuring unit 101 counts the number of users whose cell radius magnitude is equal to or greater than the threshold value based on the cell radii of the users. If the number of users whose cell radius magnitude is equal to or greater than the threshold value is greater than 0, then user number measuring unit 101 outputs the number of users whose cell radius magnitude is equal to or greater than the threshold value to shared correlator number calculator 25. If the number of users whose cell radius magnitude is equal to or greater than the threshold value is 0, then user number measuring unit 101 outputs the number of subscribing users to shared correlator number calculator 25.

Shared correlator number calculator 25 calculates the numbers of shared correlators allocated to the respective users from the number of subscribing users and the total number C of shared correlators 42, and outputs the numbers f1 through fM of shared correlators to delay profile calculator 21.

Figure 13:
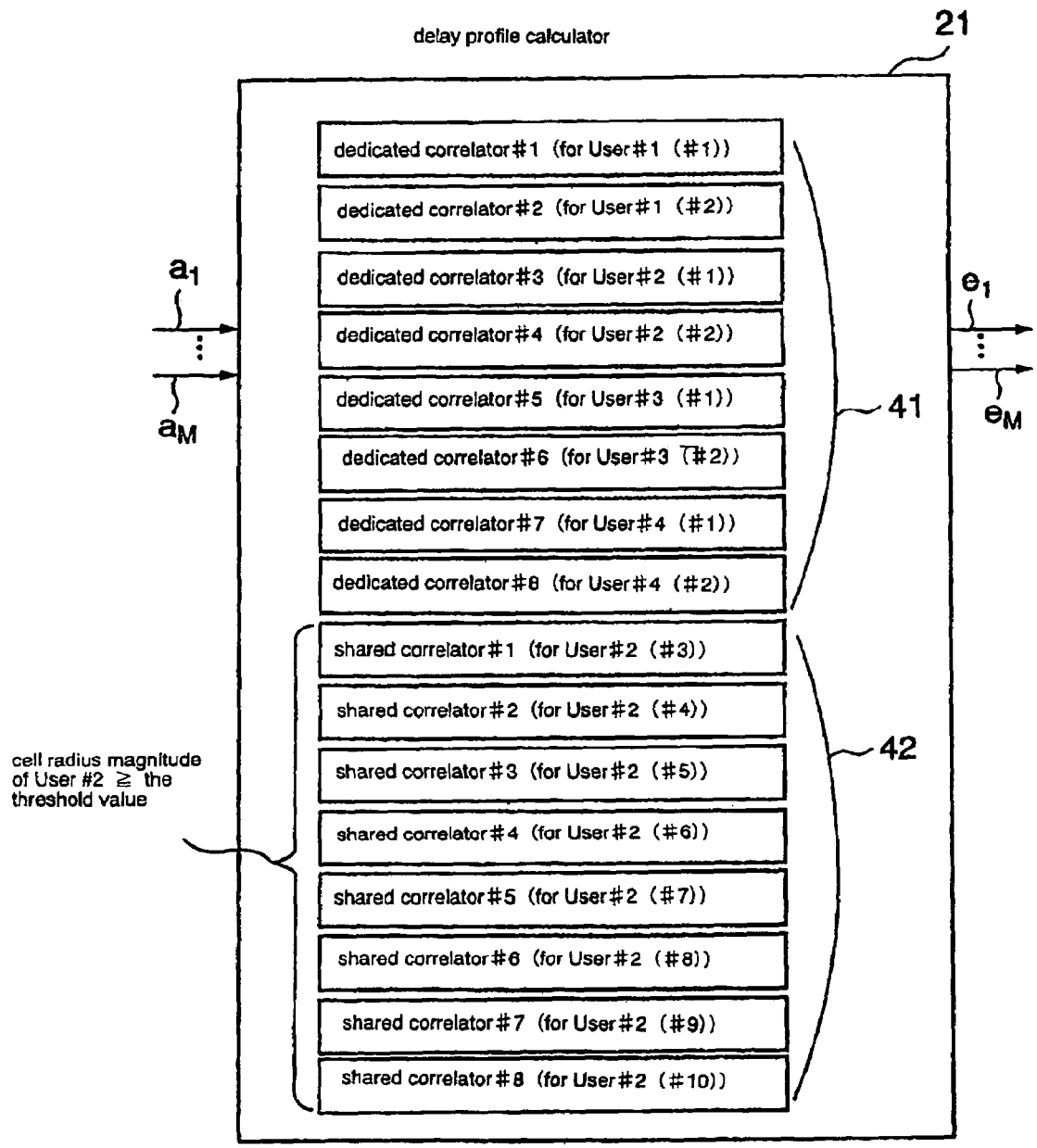
FIG. 13 is a block diagram illustrative of an instance of correlator allocation in a delay profile calculator according to the third embodiment of the present invention.

FIG. 13 is illustrative of an instance of correlator allocation in delay profile calculator 21. In FIG. 13, the number of subscribing users is 3, and the number of users whose cell radius magnitude is equal to or greater than the threshold value is 1>0 (the cell radius magnitude of User #2 is equal to or greater than the threshold value).

It is assumed that the number A of dedicated correlators 41 allocated to one user is A=2, the total number C of shared correlators 42 is C=8, and the maximum number M of subscribing users is M=4.

In FIG. 13, since the number of subscribing users is 3, and the number of users whose cell radius magnitude is equal to or greater than the threshold value is 1>0 (the cell radius magnitude of User #2 is equal to or greater than the threshold value), the number of shared correlators 42 for User #1, User #2 is 4, and the number of shared correlators 42 for User #3 is 0. The number of correlators allocated to User #2 is the sum of the number A of dedicated correlators 41 allocated to one user and the number f2 of shared correlators 42 for User #2, i.e., 2+8=10. The number of correlators allocated to User #1, User #3 is the sum of the number A of dedicated correlators 41 allocated to one user and the numbers f1, f3 of shared correlators 42 for User #1, User #3, i.e., 2+0=2.

According to the above processing sequence, it is possible to allocate more correlators to users whose cell radius is greater.

4th Embodiment

A fourth embodiment of the present invention will be described in detail below with reference to FIGS. 14 through 16.

Figure 14:
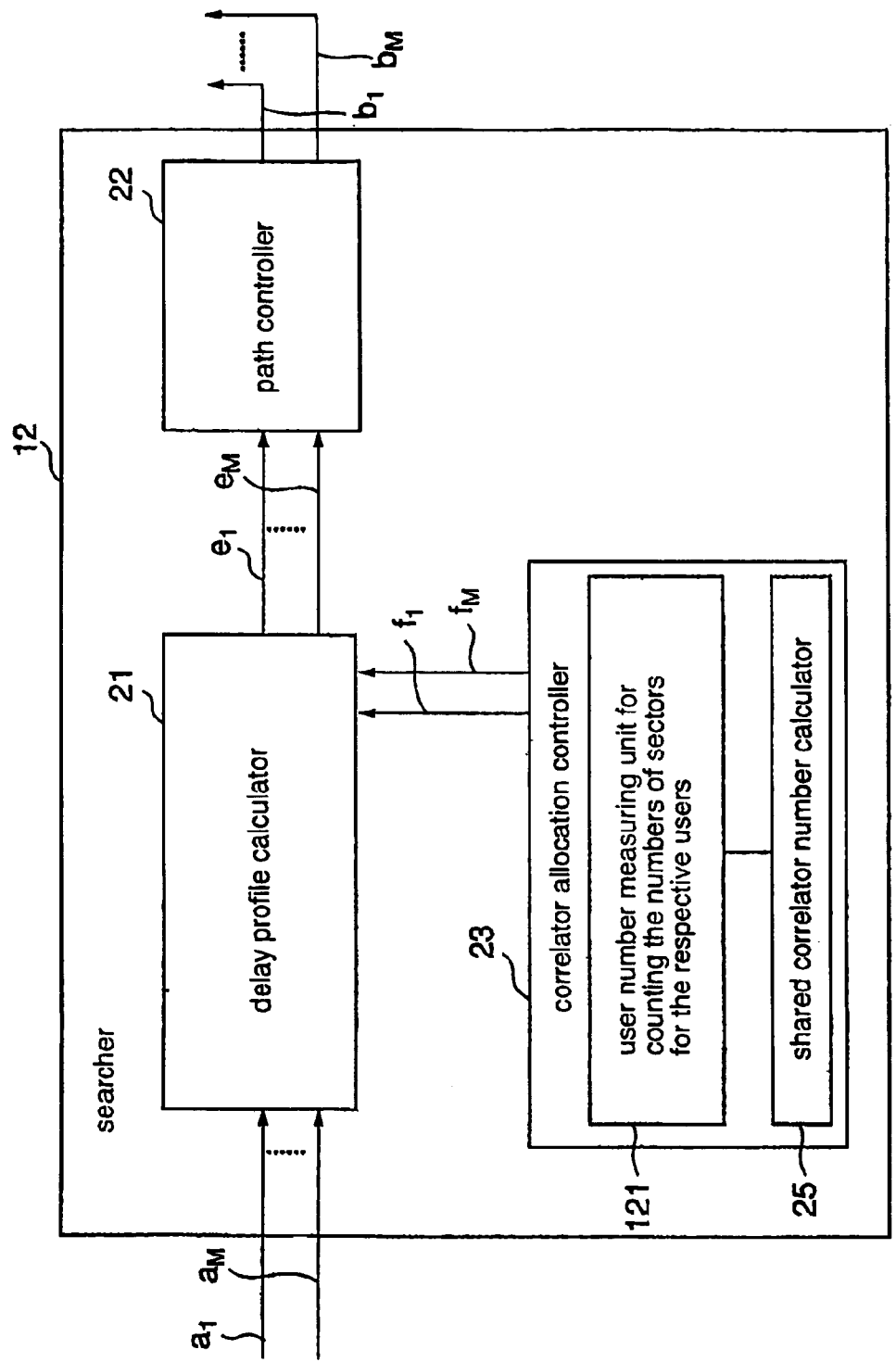
FIG. 14 is a block diagram showing details of a searcher according to a fourth embodiment of the present invention.

FIG. 14 is a block diagram showing details of a searcher according to a fourth embodiment of the present invention. The fourth embodiment differs from the first embodiment in that the numbers of sectors for the respective users is taken into account when the number of shared correlators allocated to users is calculated from the number of subscribing users and the total number C of shared correlators 42 by shared correlator number calculator 25.

As shown in FIG. 14, correlator allocation controller 23 has measuring unit 121 for counting the numbers of sectors for the respective users, instead of subscribing user number measuring unit 24. Measuring unit 121 counts the numbers of sectors for the respective users, and outputs the total number of the sectors for the respective users to shared correlator number calculator 25.

Figure 15:
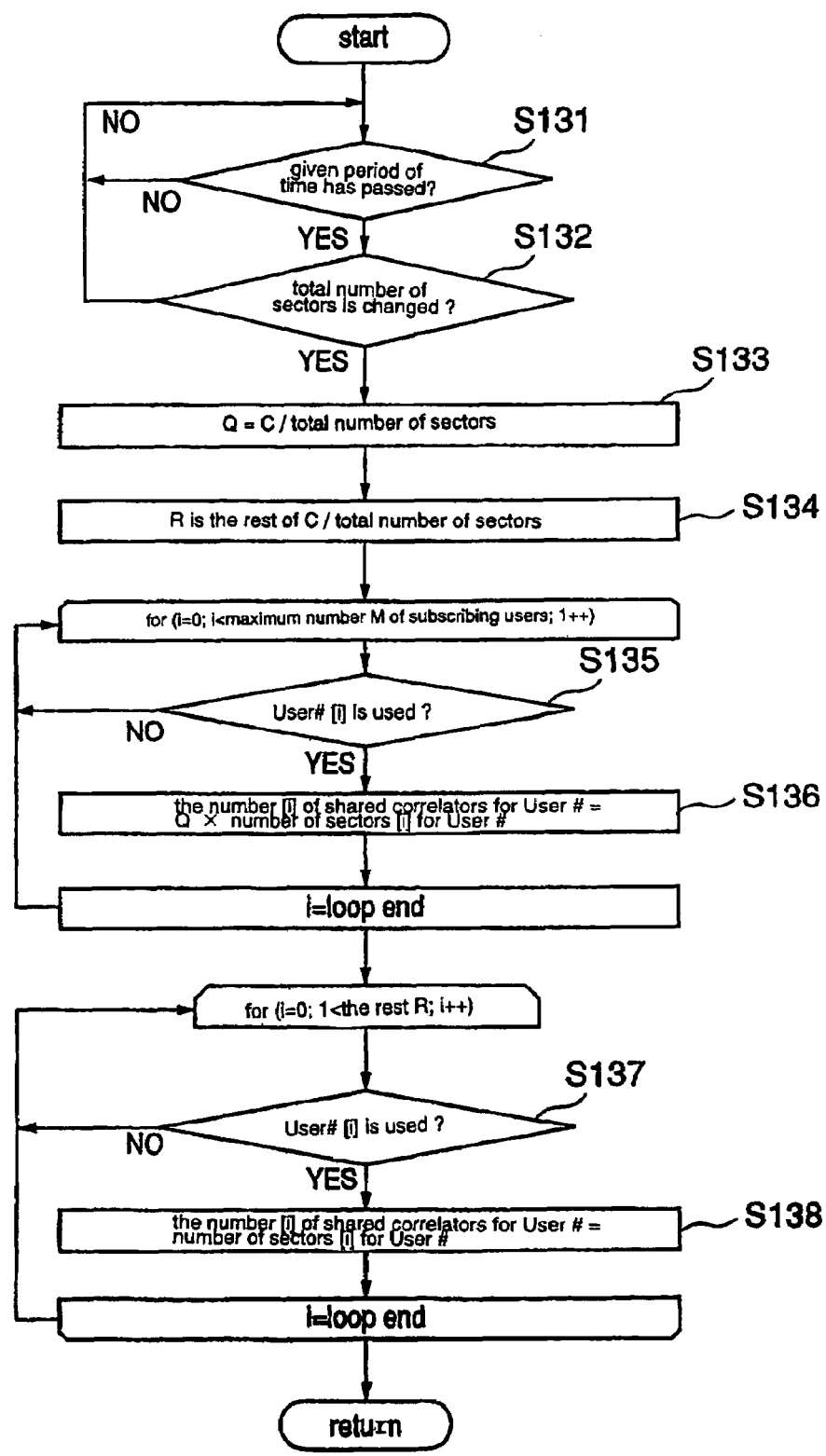
FIG. 15 is a flowchart of an operation sequence of a shared correlator number calculator according to the fourth embodiment of the present invention.

As shown in FIG. 15, shared correlator number calculator 25 makes a comparison in each given period of time to determine whether the total number of the sectors for the respective users has been changed or not (S131, S132). If the total number of the sectors for the respective users has been changed, then shared correlator number calculator 25 calculates the numbers of shared correlators allocated to the respective users from the total number of the sectors for the respective users and the total number C of shared correlators 42 (S133 through S138), and outputs the numbers of shared correlator numbers f1 through fM for the respective users to delay profile calculator 21.

Figure 16:
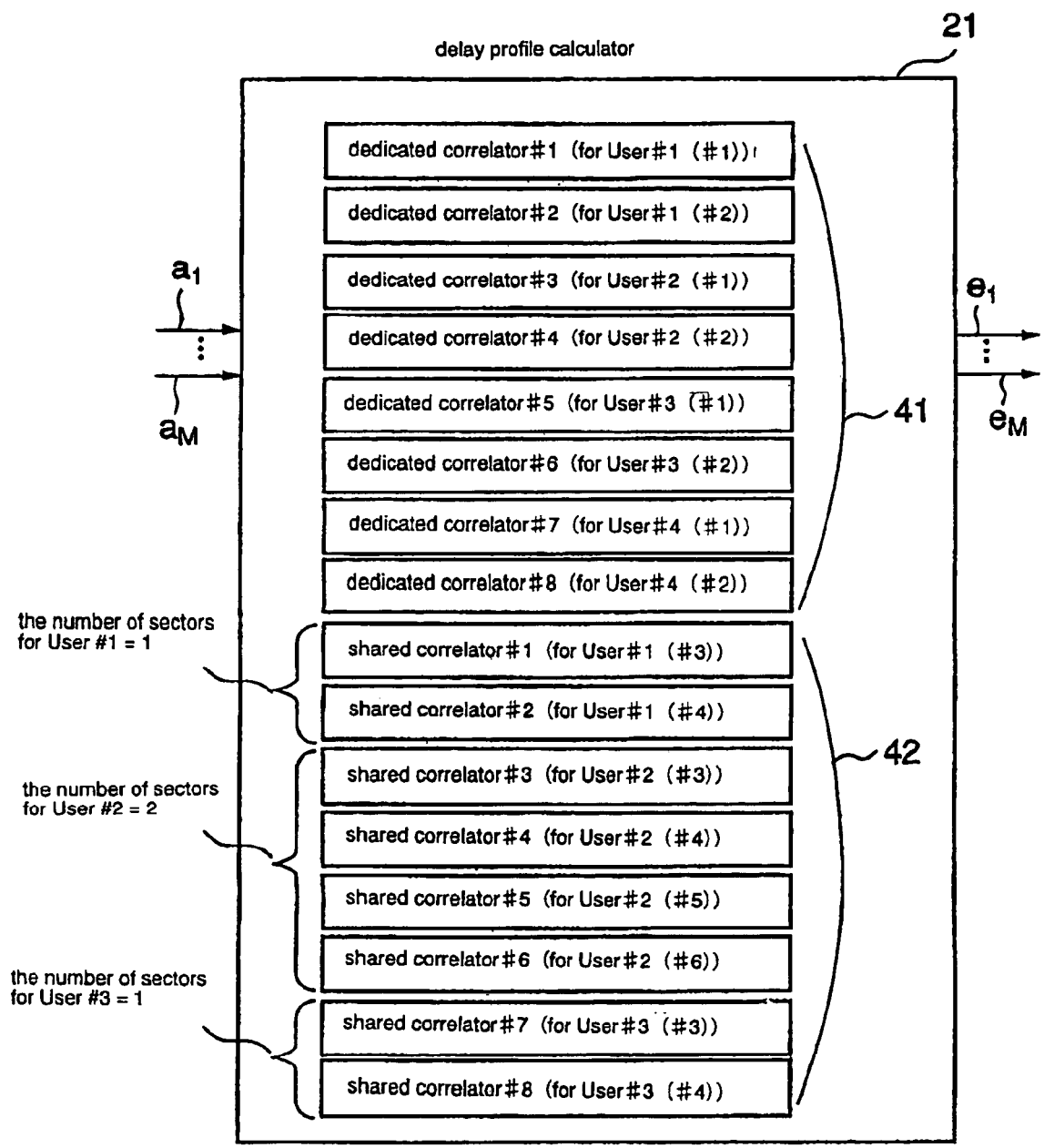
FIG. 16 is a block diagram illustrative of an instance of correlator allocation in a delay profile calculator according to the fourth embodiment of the present invention.

FIG. 16 is illustrative of an instance of correlator allocation in delay profile calculator 21. In FIG. 16, the number of subscribing users is 3, and the total number of the sectors for the respective users is 4. The number of sectors for User #1 is 1, the number of sectors for User #2 is 2, and the number of sectors for User #3 is 1.

It is assumed that the number A of dedicated correlators 41 allocated to one user is A=2, the total number C of shared correlators 42 is C=8, and the maximum number M of subscribing users is M=4.

In FIG. 16, since the number of sectors for User #1 is 1, the number of sectors for User #2 is 2, and the number of sectors for User #3 is 1, the number f2 of shared correlators 42 for User #2 is f2=4, and the numbers f1, f2 of shared correlators 42 for User #1, user #3 are 2. The number of correlators allocated to User #2 is the sum of the number A of dedicated correlators 41 allocated to one user and the number f2 of shared correlators 42 for User #2, i.e., 2+4=6. The number of correlators allocated to User #1, User #3 is the sum of the number A of dedicated correlators 41 allocated to one user and the numbers f1, f3 of shared correlators 42 for User #1, User #3, i.e., 2+2=4.

According to the above processing sequence, it is possible to allocate more correlators to users whose number of sectors is greater.

5th Embodiment

A fifth embodiment of the present invention will be described in detail below with reference to FIGS. 17 through 19.

Figure 17:
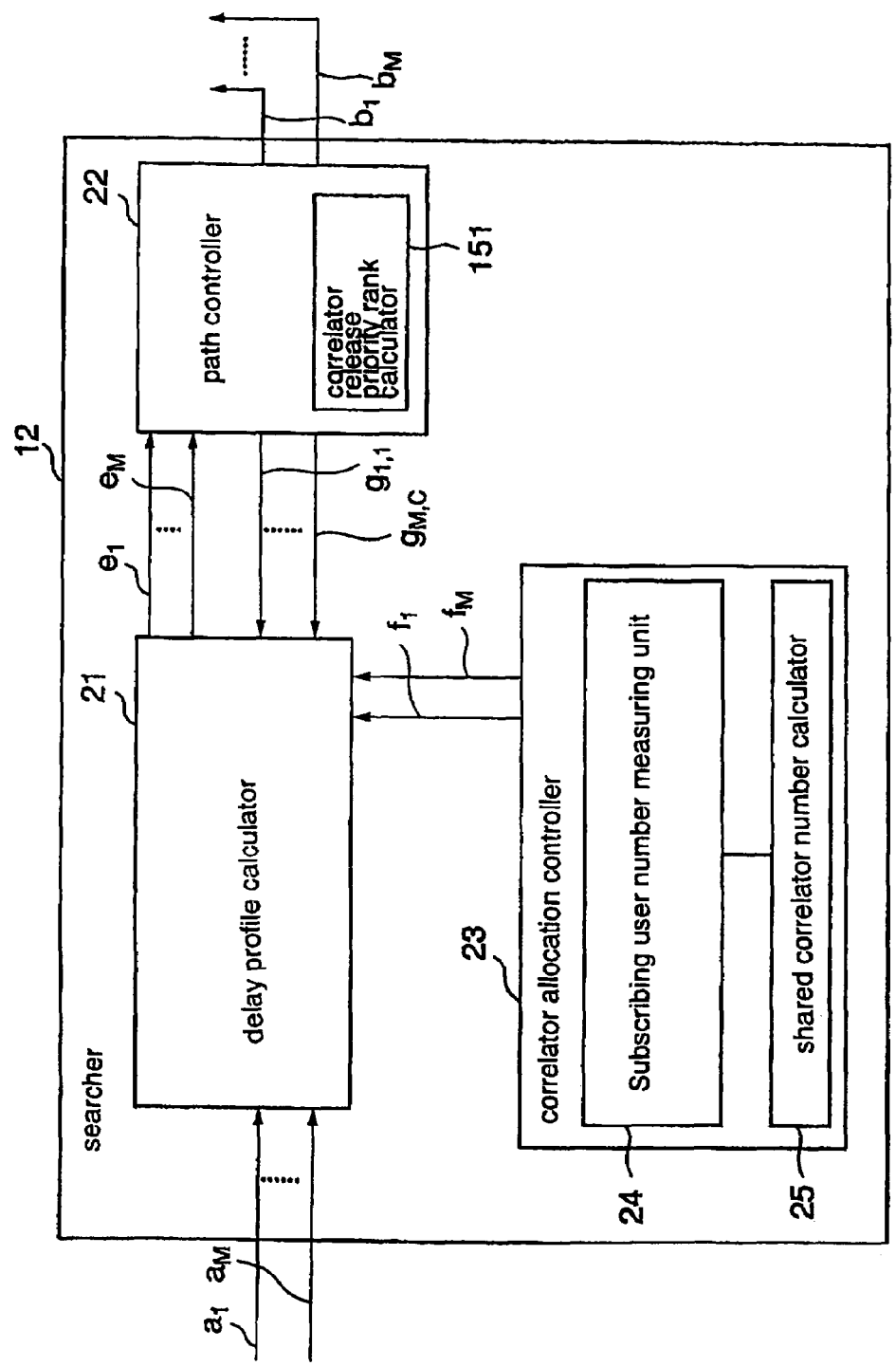
FIG. 17 is a block diagram showing details of a searcher according to a fifth embodiment of the present invention.

FIG. 17 is a block diagram showing details of a searcher according to a fifth embodiment of the present invention. The fifth embodiment differs from the first embodiment in that path controller 22 has correlator release priority rank calculator 151 for taking into account the release priority ranks of correlators for respective subscribing users.

Correlator release priority rank calculator 151 calculates release priority ranks g1,1 through gM,C of correlators for respective subscribing users in each given period of time from path information (peak timings b1 through bM for the respective users, etc.) detected by path controller 22, and outputs calculated release priority ranks g1,1 through gM,C to delay profile calculator 21.

Release priority ranks g1,1 through gM,C are judged based on whether there is a path or not in added correlated values (delay profiles) d which are output from the respective correlators, and are established such that the release priority rank is low for a correlator where there is a path and high for a correlator where there is no path.

Shared correlator number calculator 25 calculates the numbers of shared correlators allocated to the respective users from the number of subscribing users and the total number C of shared correlators 42, and outputs the numbers of shared correlator numbers f1 through fM for the respective users to delay profile calculator 21.

Figure 18:
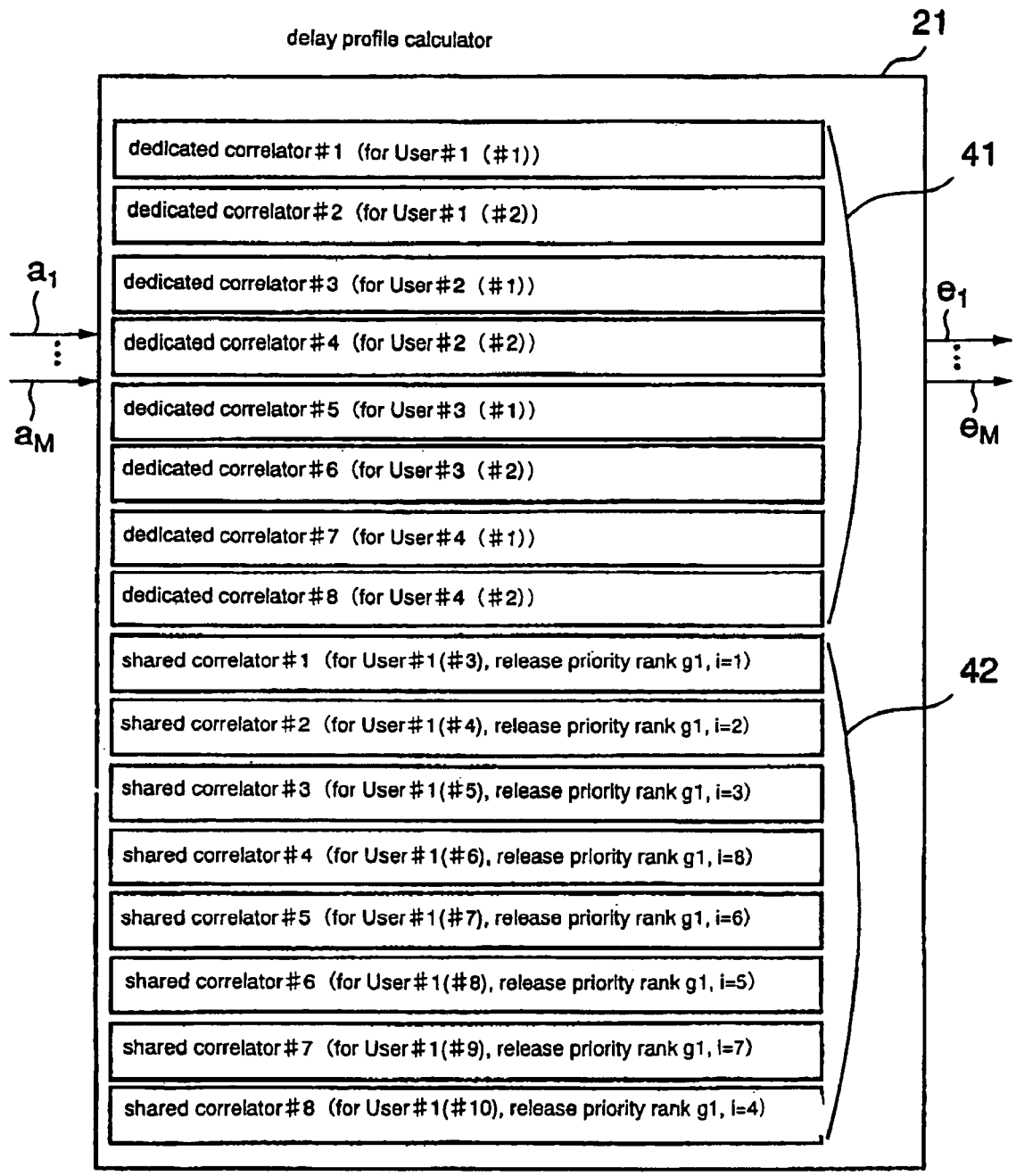
FIG. 18 is a block diagram illustrative of an instance of correlator allocation in a delay profile calculator according to the fifth embodiment of the present invention.
Figure 19:
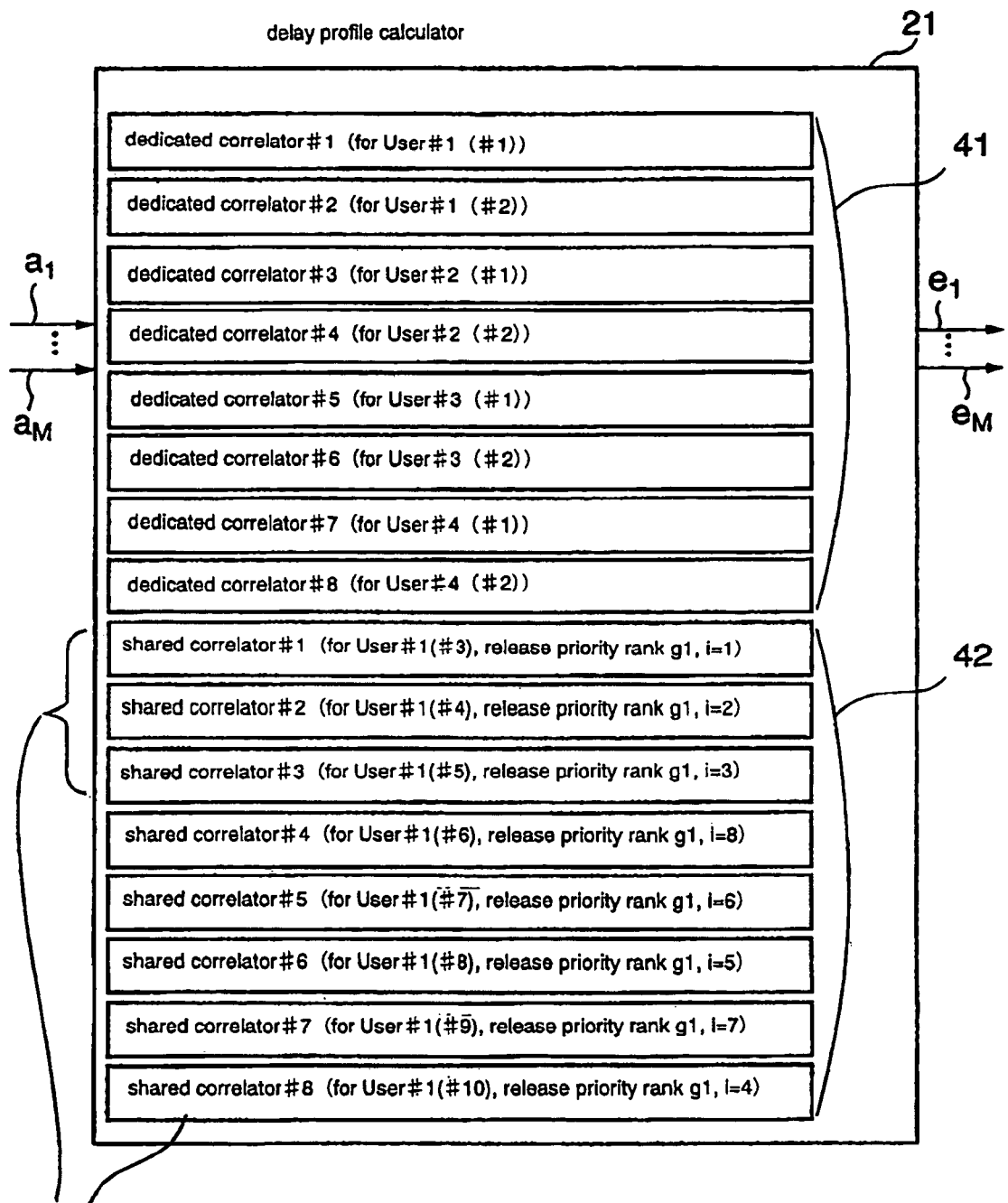
FIG. 19 is a block diagram illustrative of another instance of correlator allocation in a delay profile calculator according to the fifth embodiment of the present invention.

FIGS. 18 and 19 are illustrative of instances of correlator allocation in delay profile calculator 21. In FIG. 18, the number of subscribing users is 1, and in FIG. 19, the number of subscribing users is 2.

In FIGS. 18 and 19, it is assumed that the number A of dedicated correlators 41 allocated to one user is A=2, the total number C of shared correlators 42 is C=8, and the maximum number M of subscribing users is M=4.

In FIG. 18, since the number of subscribing users is 1, the number of correlators allocated to User #1 is the sum of the number A of dedicated correlators 41 allocated to one user and the number f1 of shared correlators 42 for User #1, i.e., 2+8=10.

The release priority ranks g1,1 through gM,8 of the correlators for User #1 are g1,1=1, g1,2=2, g1,3=3, g1,4=8, g1,5=6, g1,6=5, g1,7=7, and g1,8=4.

In FIG. 19, User #2 which is a new user is added and the number of subscribing users is changed to 2 from the state shown in FIG. 18.

In FIG. 19, since the number of subscribing users is 2, the number of correlators allocated to User #1, User #2 is the sum of the number A of dedicated correlators 41 allocated to one user and the numbers f1, f2 of shared correlators 42 for User #1, User #2 i.e., 2+4=6. Of the number f1=8 of shared correlators 42 allocated to User #1, the four correlators with the higher ranks g1,1=1, g1,2=2, g1,3=3, g1,8=4 among the release priority ranks g1,1 through gM,8 of the correlators assigned to User #1, User #2 are released and allocated to User #2.

According to the above processing sequence, it is possible to immediately allocate more correlators to User #2 which is a new user.

Figure 20:
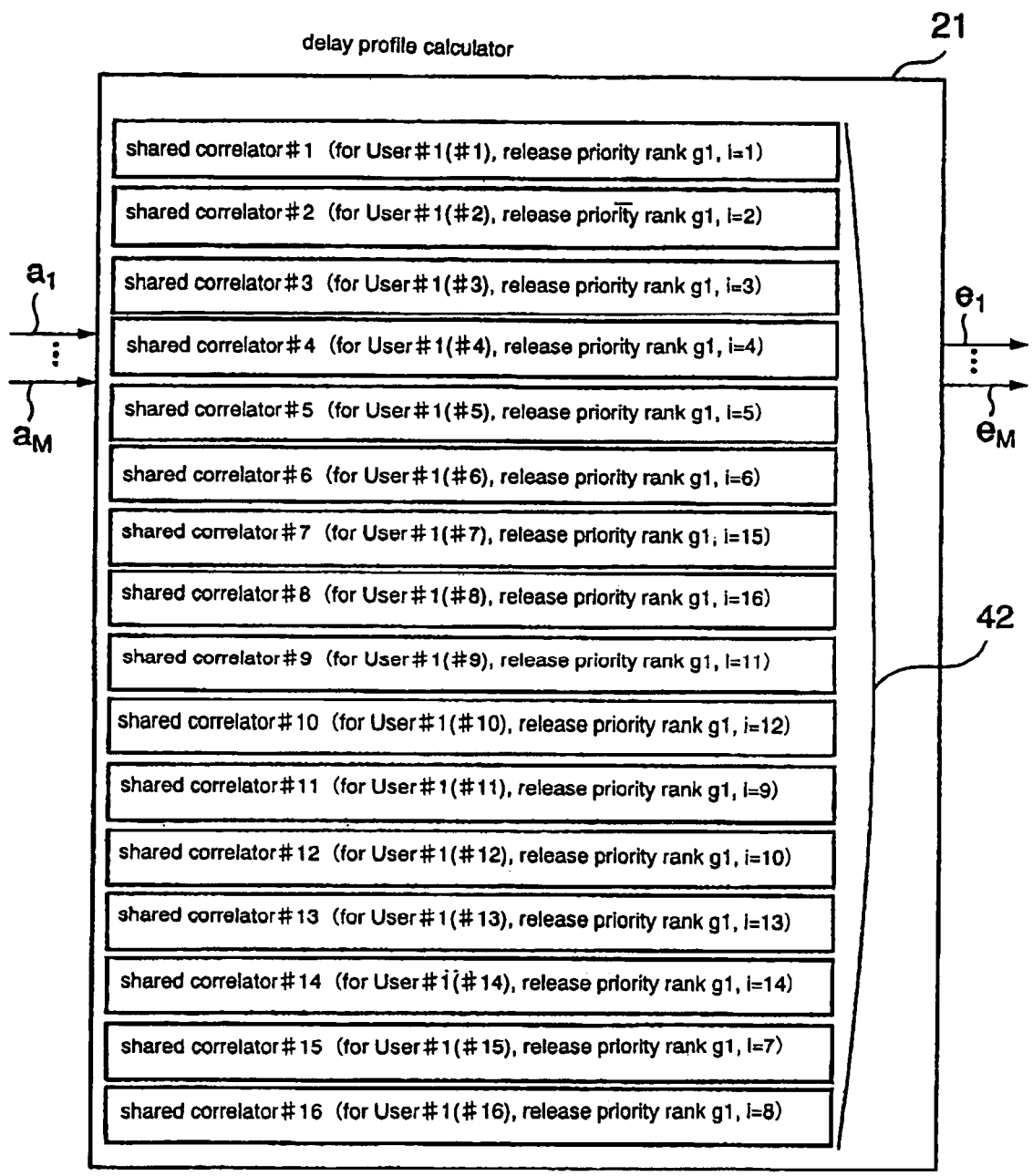
FIG. 20 is a block diagram illustrative of still another instance of correlator allocation in a delay profile calculator according to the fifth embodiment of the present invention.
Figure 21:
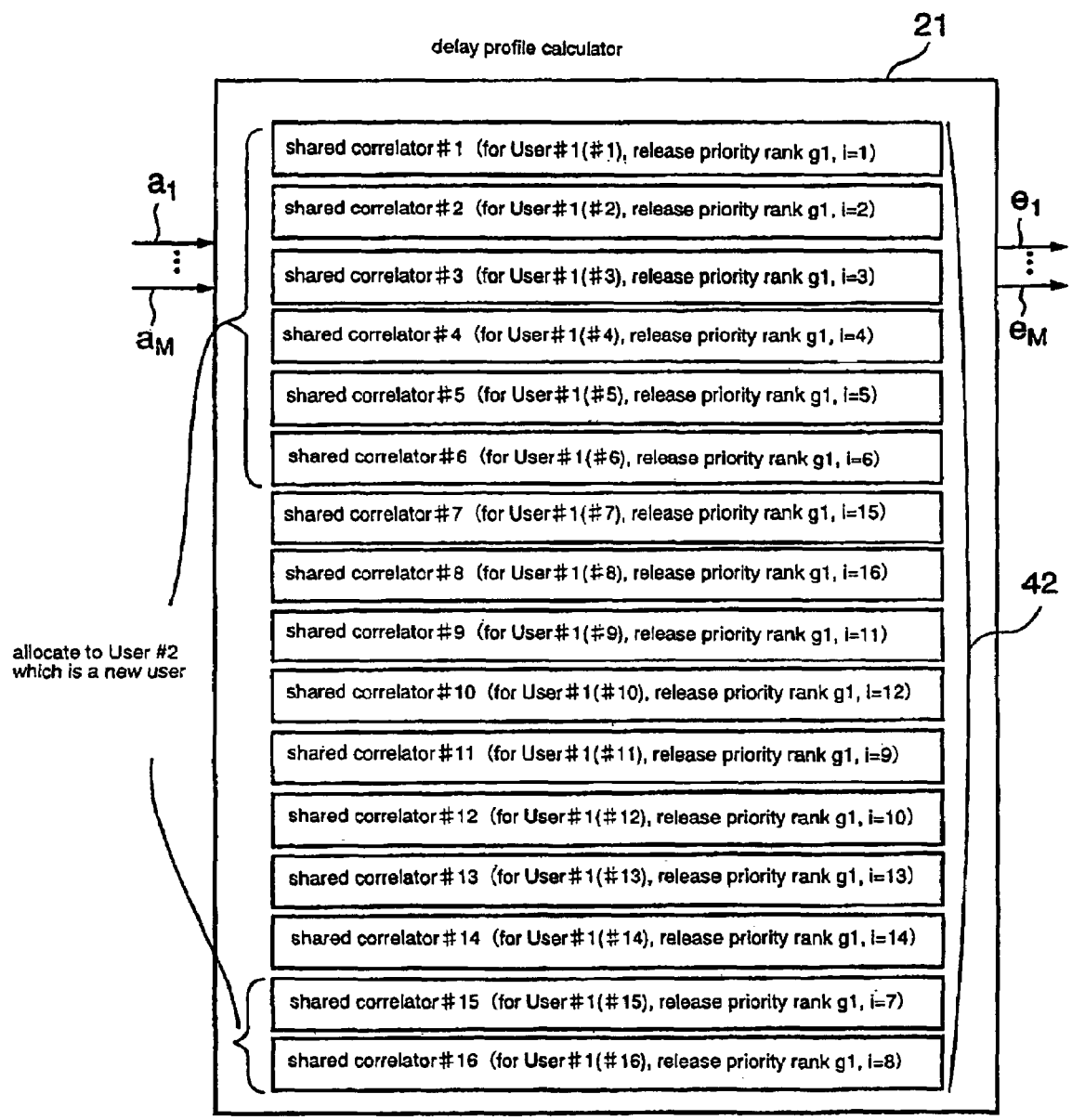
FIG. 21 is a block diagram illustrative of yet another instance of correlator allocation in a delay profile calculator according to the fifth embodiment of the present invention.

The present embodiment is also applicable to delay profile calculator 21 which comprises shared correlators 42 only, as shown in FIGS. 20 and 21.

The first through fifth embodiments described above may be combined into other embodiments.

For example, when the number of shared correlators allocated to users is calculated from the number of subscribing users and the total number C of shared correlators 42 by shared correlator number calculator 25, both the quality of reception data and the magnitude of a cell radius may be taken into account.

Furthermore, in the embodiment wherein the magnitude of a cell radius is taken into account as shown in FIG. 12, it may be presumed that cell radii are different for respective sectors, and those cell radii for respective sectors may be taken into account.

In addition, in the embodiment wherein the numbers of sectors for the respective users is taken into account as shown in FIG. 14, only effective sectors among the number of sectors for each user may be taken into account.

Moreover, the embodiment wherein the release priority ranks of correlators for respective subscribing users are taken into account as shown in FIG. 17 may be combined with all the other embodiments of the present invention, providing another embodiment.

While preferred embodiments of the present invention have been described using specific terms, such description is for illustrative purposes only, and it is to be understood that changes and variations may be made without departing from the spirit or scope of the following claims.

What is claimed is:

1. A CDMA receiver for receiving a plurality of reception data and determining correlated value levels while shifting despreading timings for respective users to obtain optimum reception timings for the respective users, comprising:
   a searcher comprising:
   a delay profile calculator having A dedicated correlators (A is an integer of 2 or greater) allocated to each user and C shared correlators (C is an integer of 2 or greater) allocated to each user; and
   a correlator allocation controller for calculating the numbers (f1 through fM) of shared correlators allocated to respective subscribing users (Y1 through YM (M: the maximum number of subscribing users) based on said number of subscribing users and the total number (C) of shared correlators allocated to the subscribing users, and outputting data indicative of the numbers of shared correlators allocated to the respective subscribing users to said delay profile calculator.

2. A CDMA receiver according to claim 1, wherein said delay profile calculator calculates, as the numbers of correlators allocated to the subscribing users, the sum of the numbers (f1 through fM) of shared correlators allocated to the respective subscribing users, which have been output from said correlator allocation controller, and the number (A) of dedicated correlators allocated to each user.

3. A CDMA receiver according to claim 1, wherein said correlator allocation controller comprises:
   a subscribing user number measuring unit for measuring the number of subscribing users and outputting data indicative of the measured number of subscribing users; and
   a shared correlator number calculator for calculating the numbers of shared correlators allocated to the subscribing users from said measured number of subscribing users and said total number of shared correlators, and outputting data indicative of the numbers of shared correlators for the respective subscribing users to said delay profile calculator.

4. A CDMA receiver according to claim 3, wherein said shared correlator number calculator makes a comparison in each given period of time to determine whether the number of subscribing users has been changed or not, and if the number of subscribing users has been changed, calculates the numbers of shared correlators allocated to the respective users from the number of subscribing users and the total number of shared correlators, and outputs data indicative of the numbers of shared correlator numbers for the respective users to said delay profile calculator.

5. A CDMA receiver according to claim 4, wherein said subscribing user number measuring unit measures the number of users whose reception data quality is lower than a threshold value, outputs data indicative of the number of users whose reception data quality is lower than the threshold value to said shared correlator number calculator if the number of users whose reception data quality is lower than the threshold value is greater than 0, and outputs data indicative of the number of subscribing users to said shared correlator number calculator if the number of users whose reception data quality is lower than the threshold value is 0.

6. A CDMA receiver according to claim 4, wherein said subscribing user number measuring unit measures the number of users whose cell radius magnitude is equal to or greater than a threshold value, outputs data indicative of the number of users whose cell radius magnitude is equal to or greater than the threshold value to said shared correlator number calculator if the number of users whose cell radius magnitude is equal to or greater than the threshold value is greater than 0, and outputs data indicative of the number of subscribing users to said shared correlator number calculator if the number of users whose cell radius magnitude is equal to or greater than the threshold value is 0.

7. A CDMA receiver according to claim 1, wherein said correlator allocation controller comprises:
  a subscribing user sector number measuring unit for measuring the numbers of sectors for respective subscribing users and outputting data indicative of the total number of sectors for the subscribing users; and
  a shared correlator number calculator for calculating the numbers of shared correlators allocated to the subscribing users from said measured number of subscribing users and said total number of shared correlators, and outputting data indicative of the numbers of shared correlators for the respective subscribing users to said delay profile calculator.

8. A CDMA receiver according to claim 7, wherein said shared correlator number calculator makes a comparison in each given period of time to determine whether the total number of sectors for the subscribing users has been changed or not, and if the total number of sectors for the subscribing users has been changed, calculates the numbers of shared correlators allocated to the respective users from the total number of sectors for the subscribing users and the total number of shared correlators, and outputs data indicative of the numbers of shared correlator numbers for the respective users to said delay profile calculator.

9. A CDMA receiver according to claim 1, wherein said searcher further comprises:
  a path controller comprising:
  a release priority rank calculator for calculating release priority ranks (g1,1 through gM,C0 of shared correlators for respective subscribing users in each given period of time from peak timings for the respective users; and
  means for indicating optimum reception timing for the respective users as peak timings (b1 through bM) for the respective users based on delay profiles (e1 through eM) for the respective users which are output from said delay profile calculator.

10. A CDMA receiver according to claim 9, wherein said release priority ranks are judged based on whether there is a path or not in the delay profiles which are output from the respective correlators, and are established such that a release priority rank is low for a correlator where there is a path and high for a correlator where there is no path.

11. A method of receiving a plurality of reception data and determining correlated value levels while shifting despreading timings for respective users to allocate optimum correlators to the respective users, comprising the steps of:
  measuring the number of subscribing users;
  calculating the numbers (f1 through fM) of shared correlators allocated to respective subscribing users (Y1 through YM (M: the maximum number of subscribing users) based on said number of subscribing users and the total number (C) of shared correlators; and
  calculating, as the numbers of correlators allocated to the subscribing users, the sum of the number (A) of dedicated correlators and the numbers (f1 through fM) of shared correlators allocated to the respective subscribing users.

12. A method according to claim 11, further comprising the steps of:
  making a comparison in each given period of time to determine whether the number of subscribing users has been changed or not; and
  if the number of subscribing users has been changed, calculating the numbers of shared correlators allocated to the respective users from the number of subscribing users and the total number of shared correlators.

* * * * *